(12) United States Patent
Inokuchi et al.

(10) Patent No.: US 7,173,632 B2
(45) Date of Patent: Feb. 6, 2007

(54) INFORMATION DISPLAY

(75) Inventors: Akihiro Inokuchi, Yokohama (JP); Yasuhiko Morimoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 10/656,733

(22) Filed: Sep. 4, 2003

(65) Prior Publication Data
US 2004/0080510 A1 Apr. 29, 2004

(30) Foreign Application Priority Data
Sep. 5, 2002 (JP) ............................. 2002-260236

(51) Int. Cl.
*G09G 5/00* (2006.01)
(52) U.S. Cl. .................................... 345/619
(58) Field of Classification Search .......... 340/286.14, 340/539.2, 990, 995.1, 995.14–995.28, 400 FOR; 342/191, 357.13; 345/581; 353/5, 11; 701/200–226, 701/300–302; 702/5, 16; 707/1, 3, 4, 6, 707/7, 102; 715/968; 716/12
See application file for complete search history.

(56) References Cited
U.S. PATENT DOCUMENTS
2003/0110185 A1* 6/2003 Rhoads .................... 707/104.1

FOREIGN PATENT DOCUMENTS
JP PUPA2001-318938 11/2001

OTHER PUBLICATIONS
SIG Notes, vol. 9, No. 2 (ISSN 0919-6072) 98-NL-127, pp. 63-70, Info. Processing Society of Japan, Sep. 17, 1998.
Krzysztof Koperski, Jiawei Han, "Discovery of Spatial Association Rules in Geographic Information Databases," Advances in Spatial Databases, 4th International Symposium SSD, 1995, Portland, ME, USA, Aug. 6-9, 1995, Proceedings, U.S.A., Aug. 6, 1995, p. 47-66.

* cited by examiner

*Primary Examiner*—Kee M. Tung
*Assistant Examiner*—G. F. Cunningham
(74) *Attorney, Agent, or Firm*—Ference & Associates

(57) ABSTRACT

The information display system of the present invention has a database in which objects including position information and attribute information different from the position information are stored, and electronic map storage section, a set forming section which forms at least a certain number of sets of objects positioned in proximity with each other and including a set of objects, a section for selecting the pair of objects contained in each of the sets by locating position coordinates in the electronic map on which display is performed, assigning an indicating figure in variable indicating form, and designating position coordinates for the objects and the indicating figure to be displayed, and a section for placing objects and the indicating figure on the electronic map by using the designated position coordinates.

9 Claims, 27 Drawing Sheets

[Figure 1]
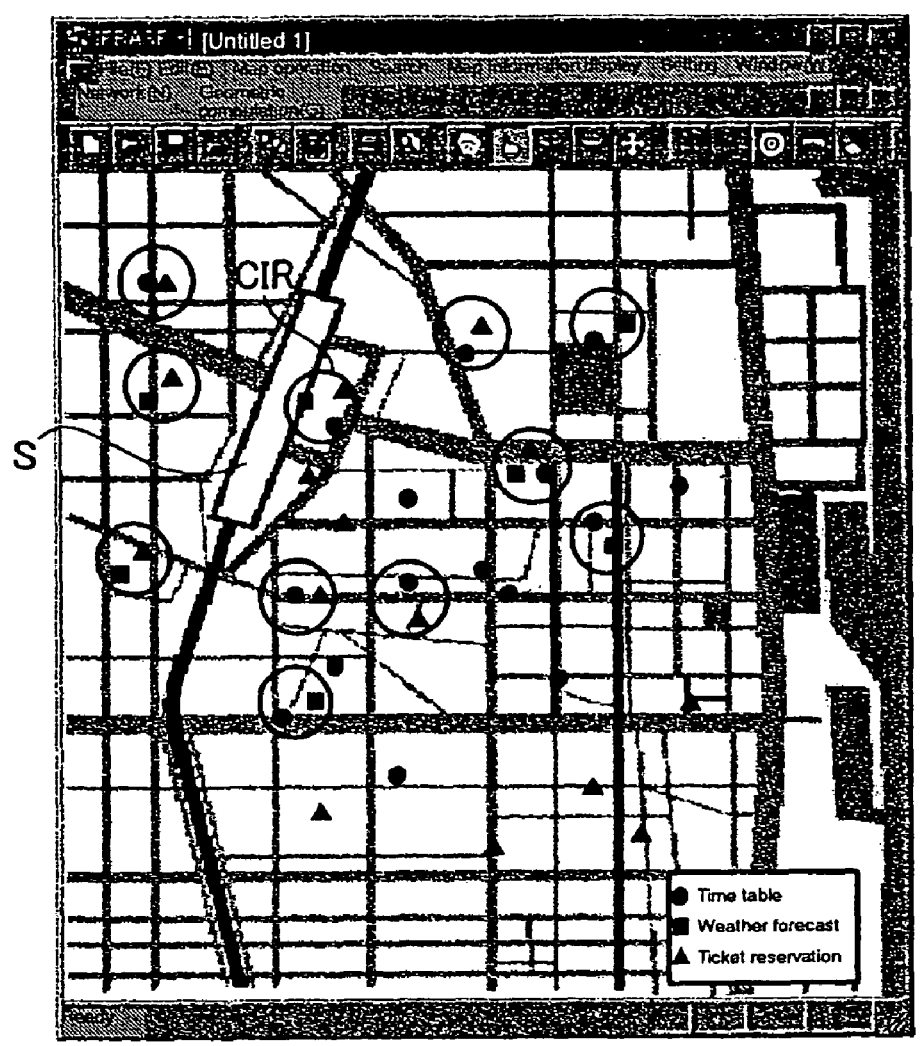

[Figure 2]

| Record number | Transaction ID | Position | Service name | Number of transmitted packets | ⋮ |
|---|---|---|---|---|---|
| 1 | ab12ef | $(x_1, y_1)$ | Weather forecast | 2 | ⋮ |
| 2 | gh34lm | $(x_2, y_2)$ | Time table | 1 | ⋮ |
| 3 | no56rs | $(x_3, y_3)$ | Ticket reservation | 4 | ⋮ |
| 4 | tu78xy | $(x_4, y_4)$ | Time table | 1 | ⋮ |

. . .

[Figure 3]
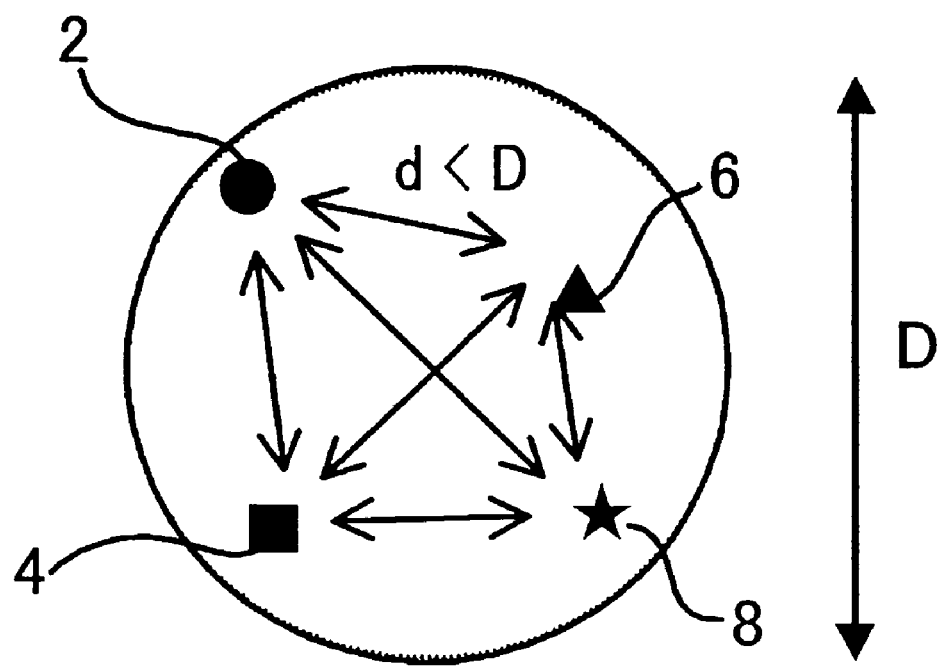

[Figure 4]
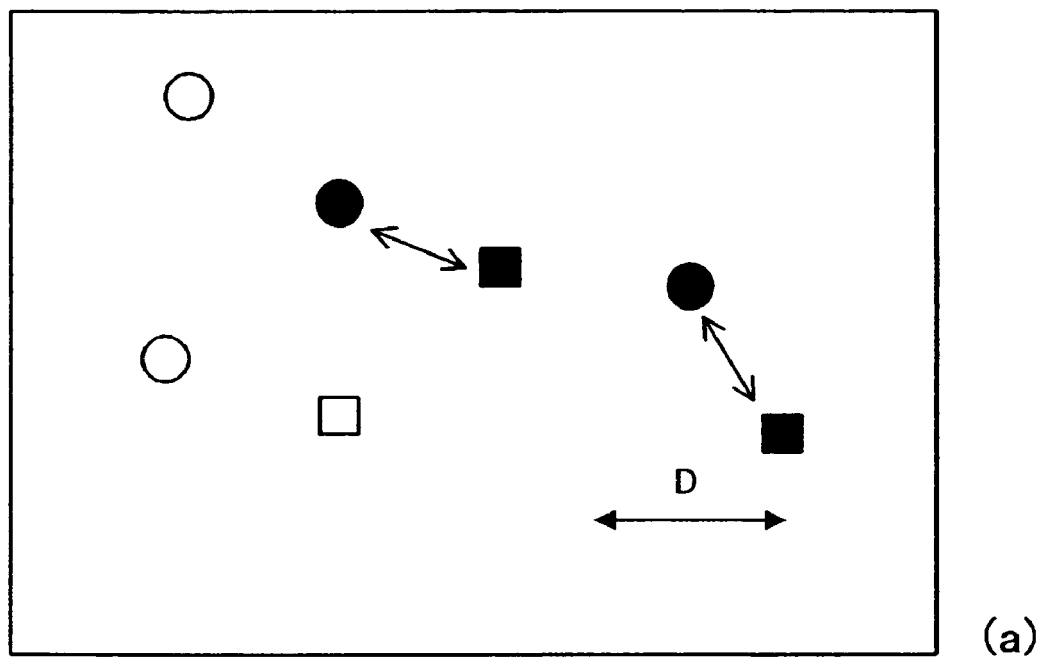
(a)
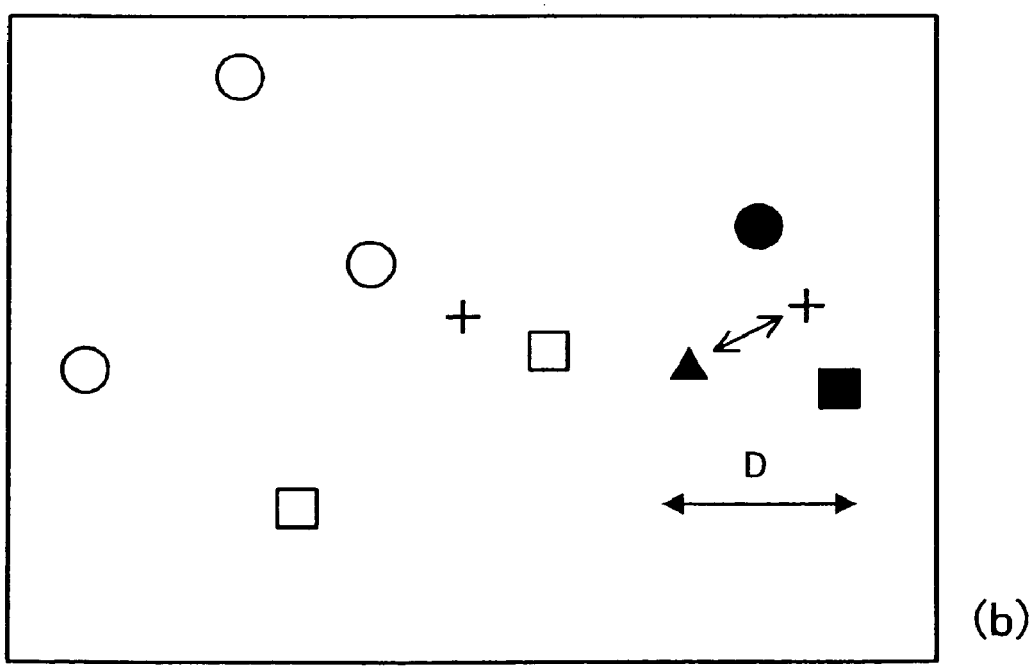
(b)

[Figure 5]
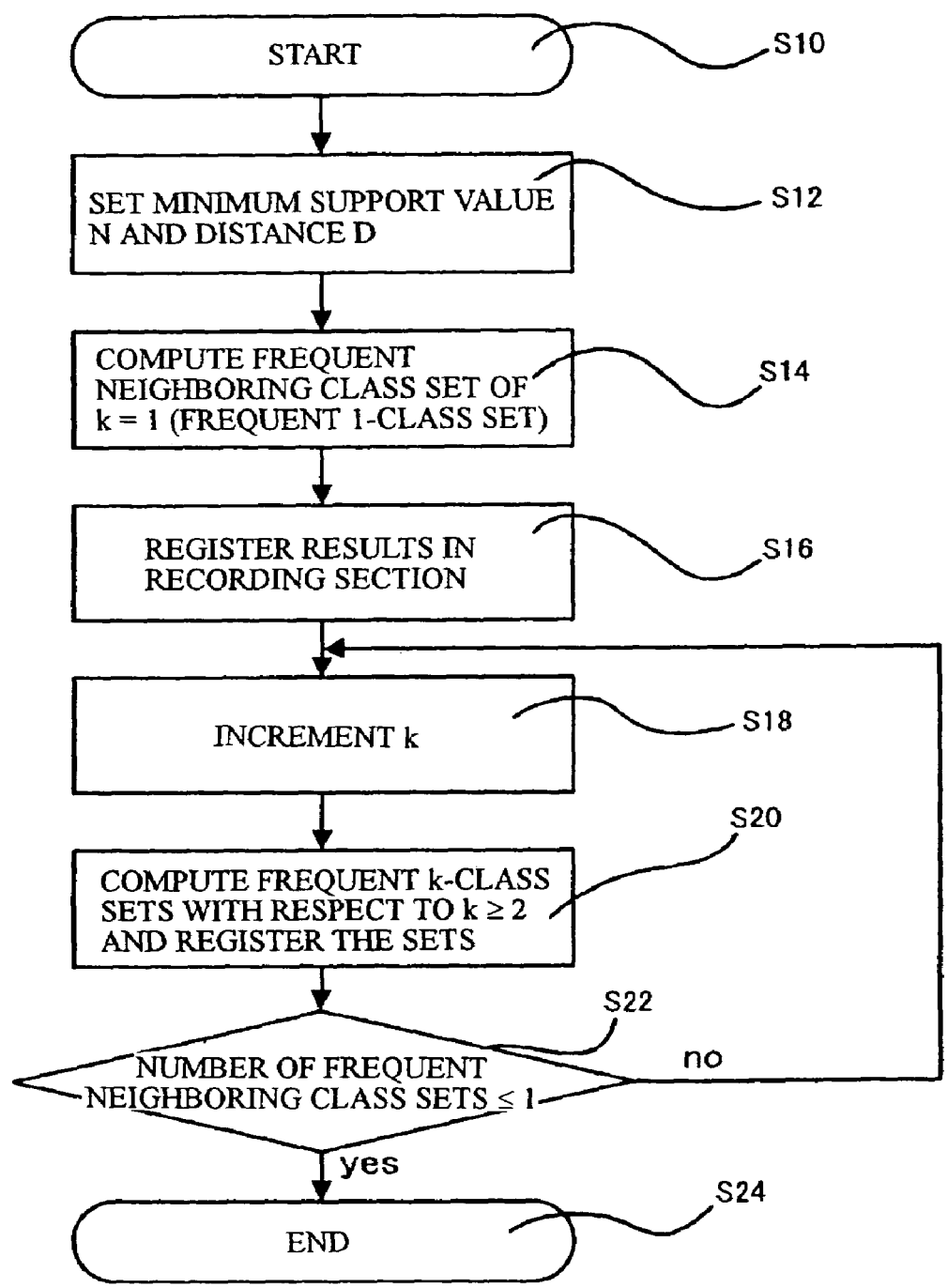

[Figure 6]
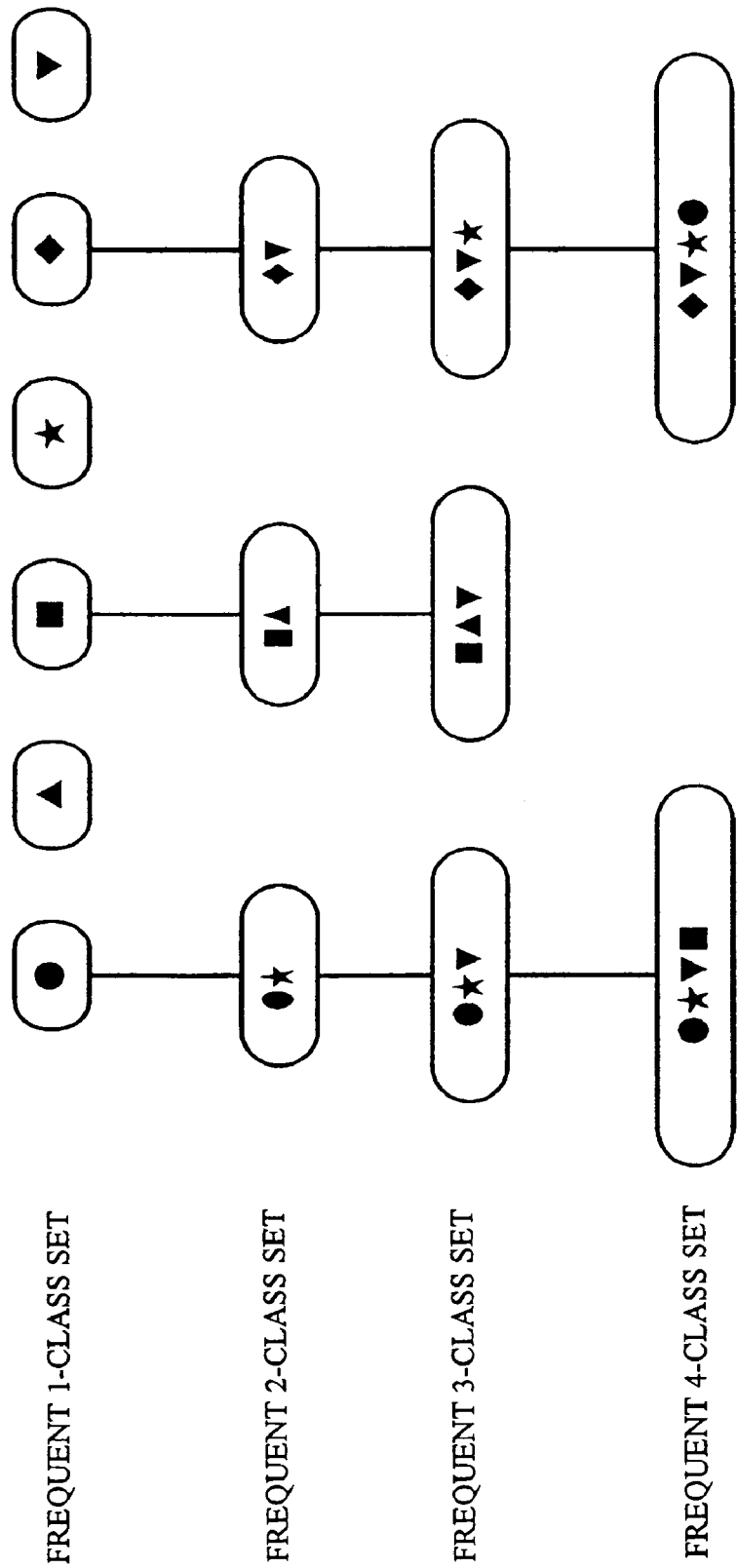

[Figure 7]

For (i=1; i≤m; i++)

/ Compute centroids of instances in proximity to frequent k-class set $C_k[i] \in S_k$)

Obtain set $G_i$ of centroids of instances /

/ Form voronoi diagram of $G_i$ /

For j=i+1; i≤m; j++

/ Set $C_k[i] \in S_k$ as another neighboring k-class set/

/ Set $C_{k+1}[i,j]$ as neighboring class set formed of sum-set $C_k[i] \cup C_k[i]$ of two frequent neighboring class sets /

If total k number of class sets formed from $|C_{k+1}[i,j]|$=k+1 and $C_{k+1}[i,j]$ are frequent $$sup(C_{k+1}[i,j])=0$$

Mark all instances of $C_k[i]$ as invalid

Set closest distance from all instances of $C_k[i]$ to $C_k[j]$ instance as ∞

For (with respect to each instance of $C_k[j]$)

Set $p_j$ to point of $p_j \in C_k[j]$ and $p_i \in C_k[i]$

Search for nearest centroid $g_{nearest} \in G_i$ from $p_j$

Set found instance with respect to centroid as $I_{nearest}$

Check If $p_{ii} \in I_{nearest}$(ii=1,...,k) is dist(pj,pii)<D

/ If all points of $I_{nearest}$ satisfy the above inequality?

If $I_{nearest}$ is marked "Invalid"

Mark "Neighboring to $p_j$"

Increment $sup(C_{k+1}[i,j])$ by 1

Set nearest distance to $C_k[j]$ instance to $dist(g_{nearest}, p_j)$

If $dist(g_{nearest}, p_j)$ is smaller than nearest distance to present $C_k[j]$ instance Update nearest distance and mark "Neighboring to $p_j$"

If $sup(C_{k+1}[i,j])$>N

Form instance of $C_{k+1}[i,j]$ from instance of $C_k[i]$ marked "Neighboring" and add $C_{k+1}[i,j]$ to $S_{k+1}$

[Figure 8]
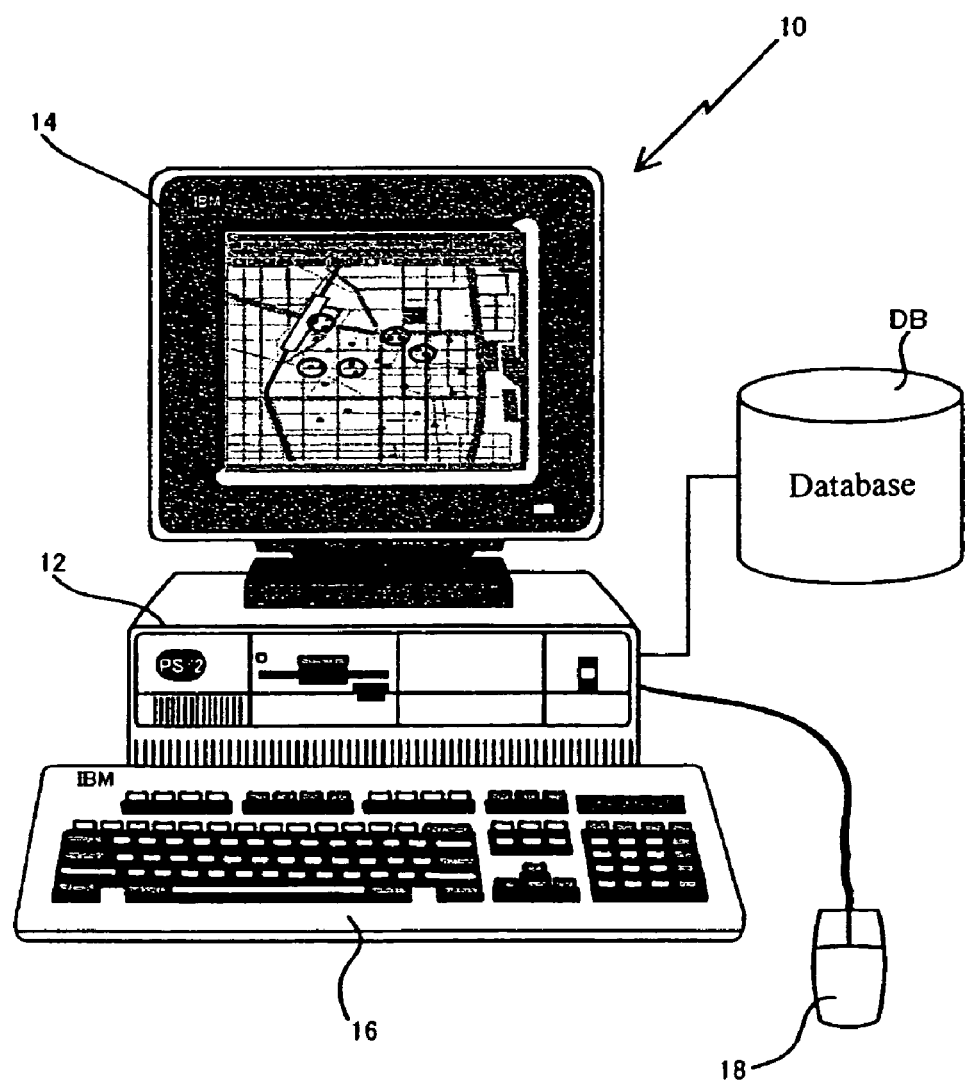

[Figure 9]
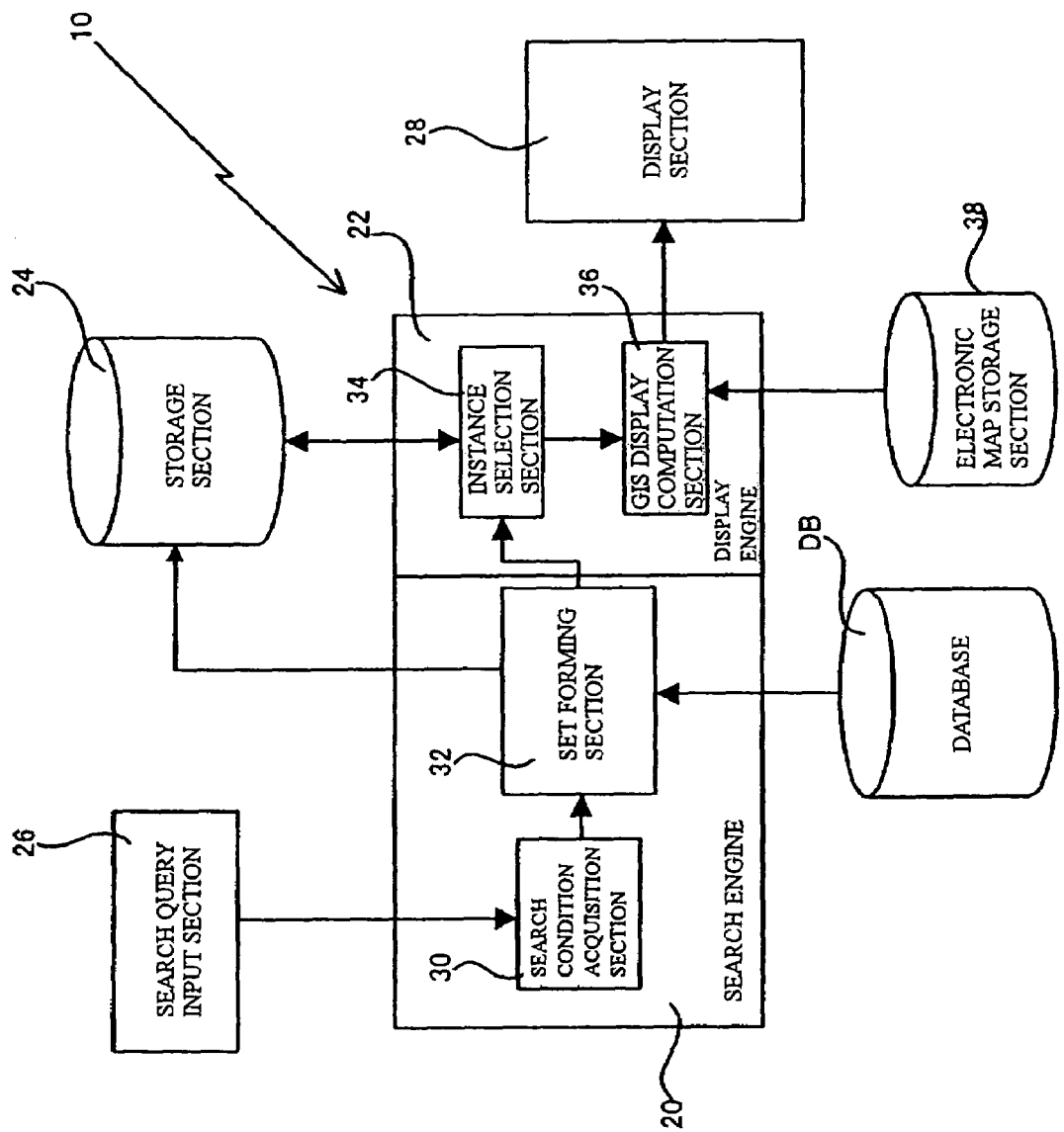

[Figure 10]
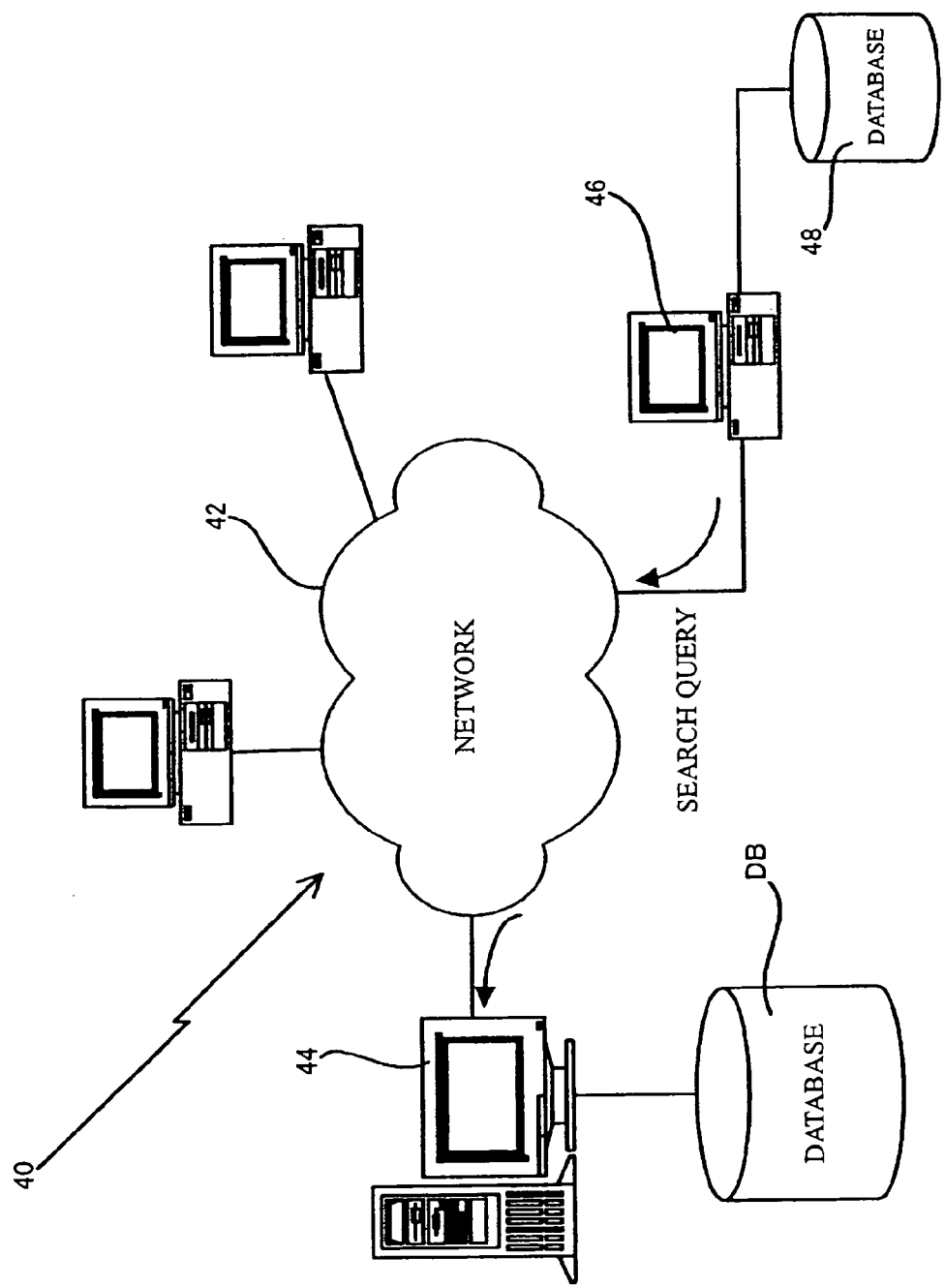

[Figure 11]
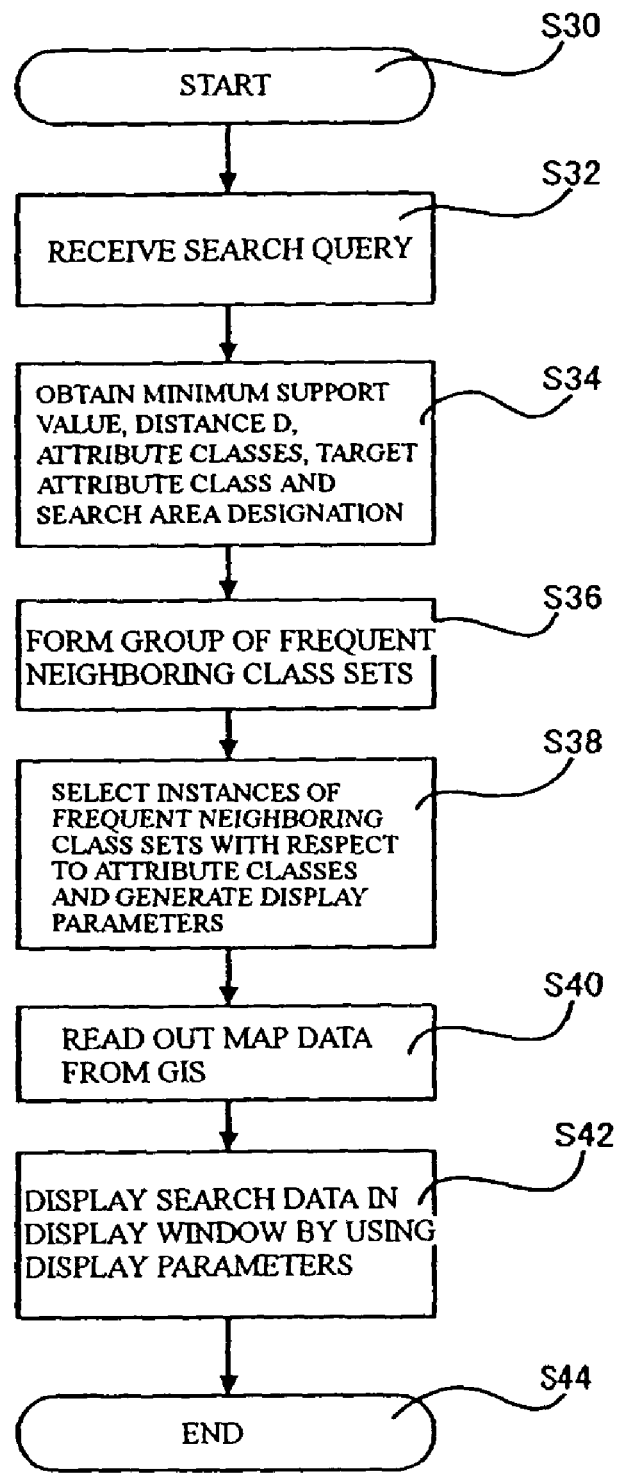

[Figure 12]
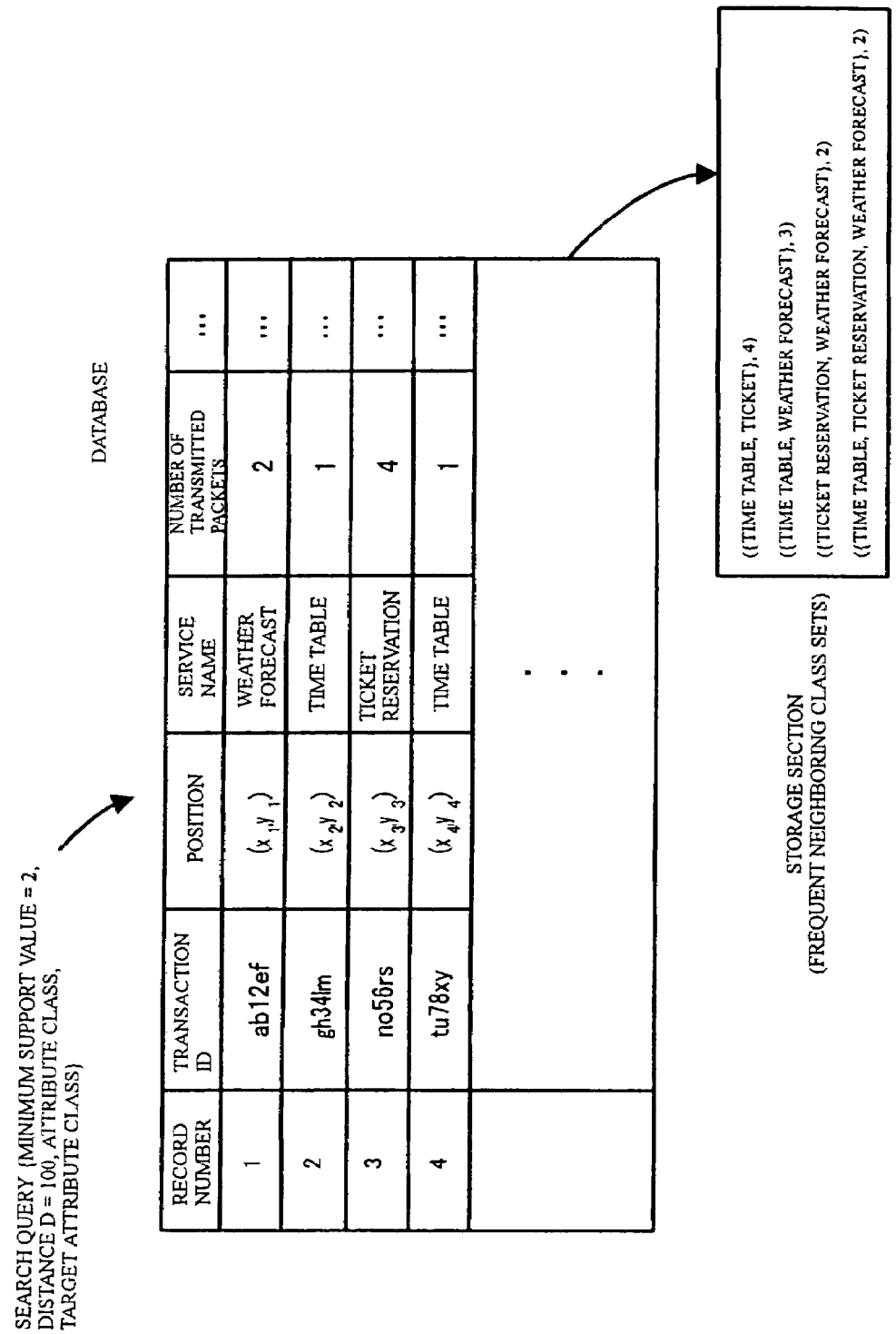

[Figure 13]
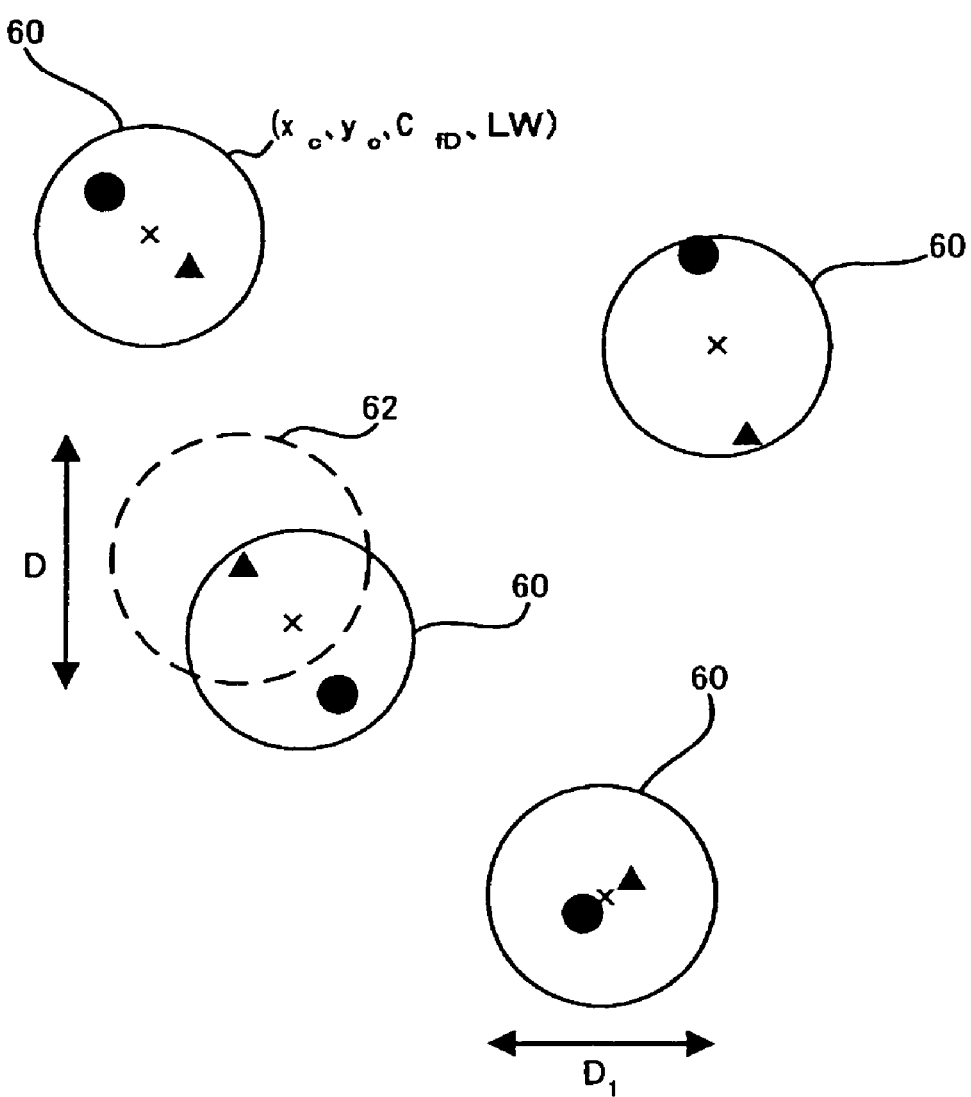

[Figure 14]
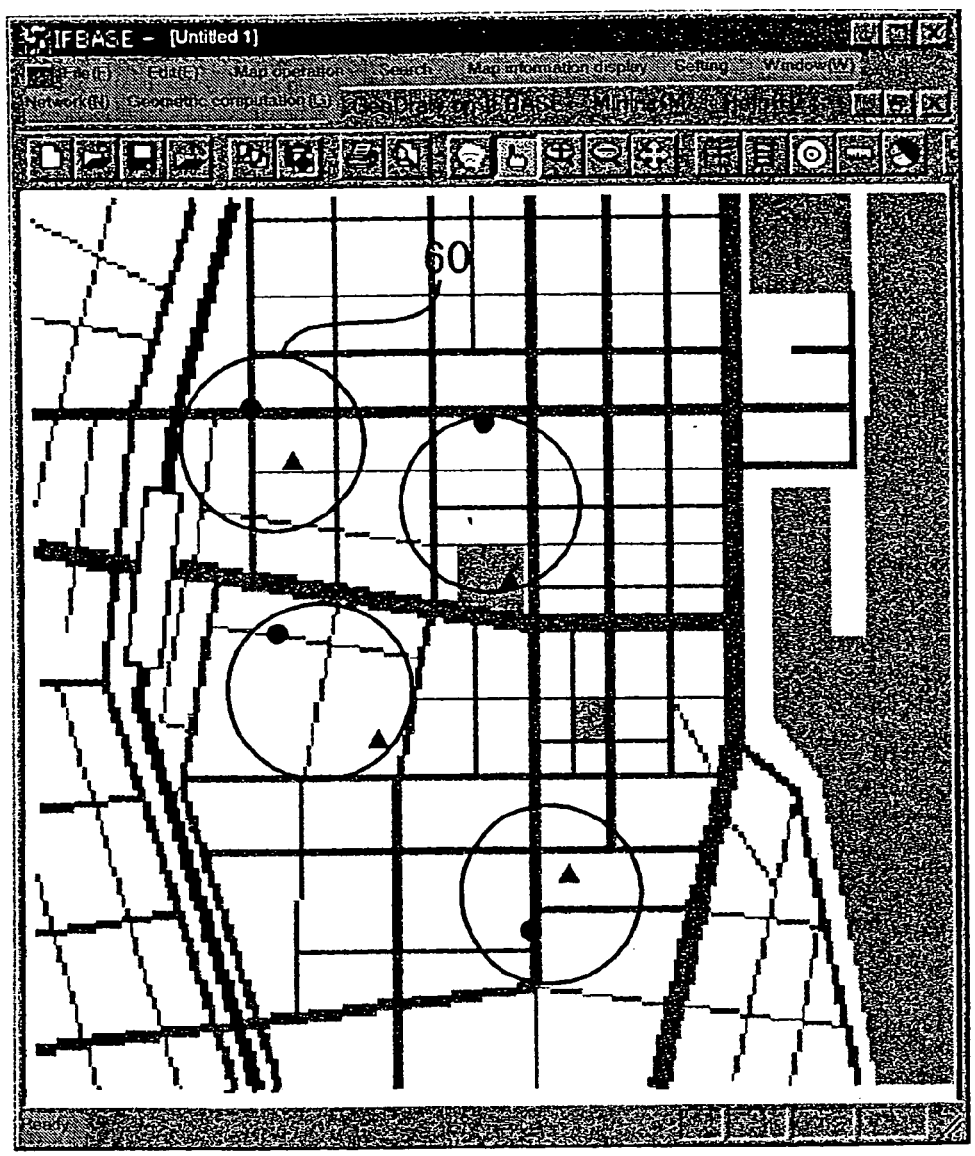

[Figure 15]
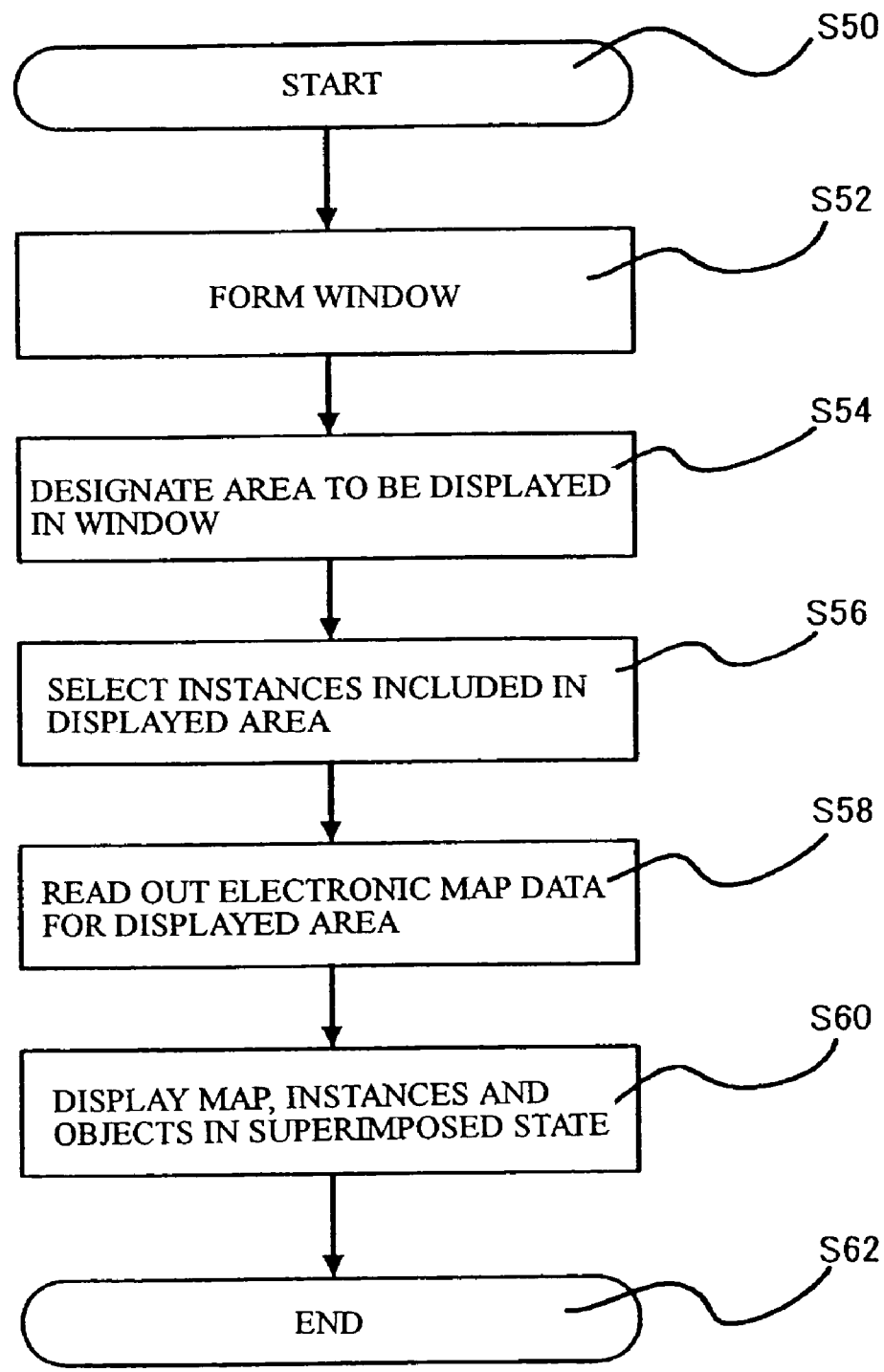

[Figure 16]
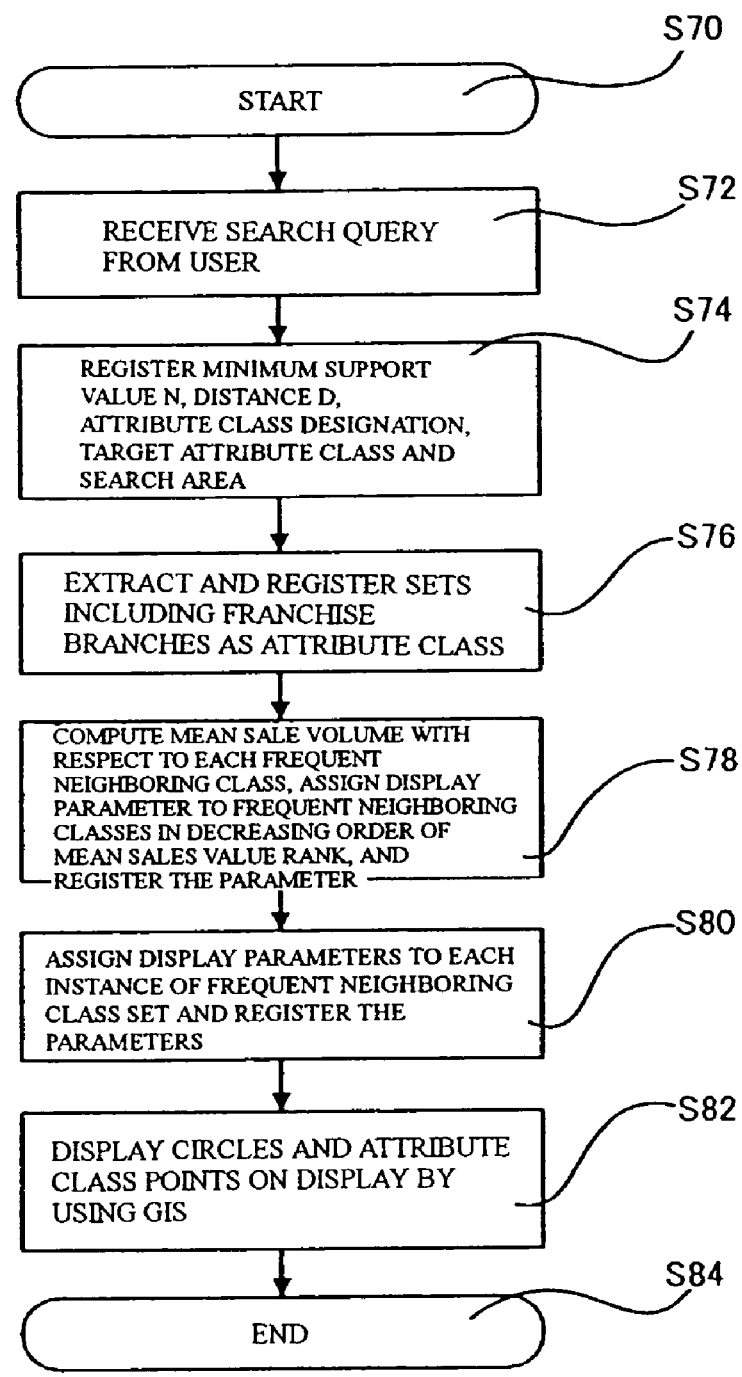

[Figure 17]
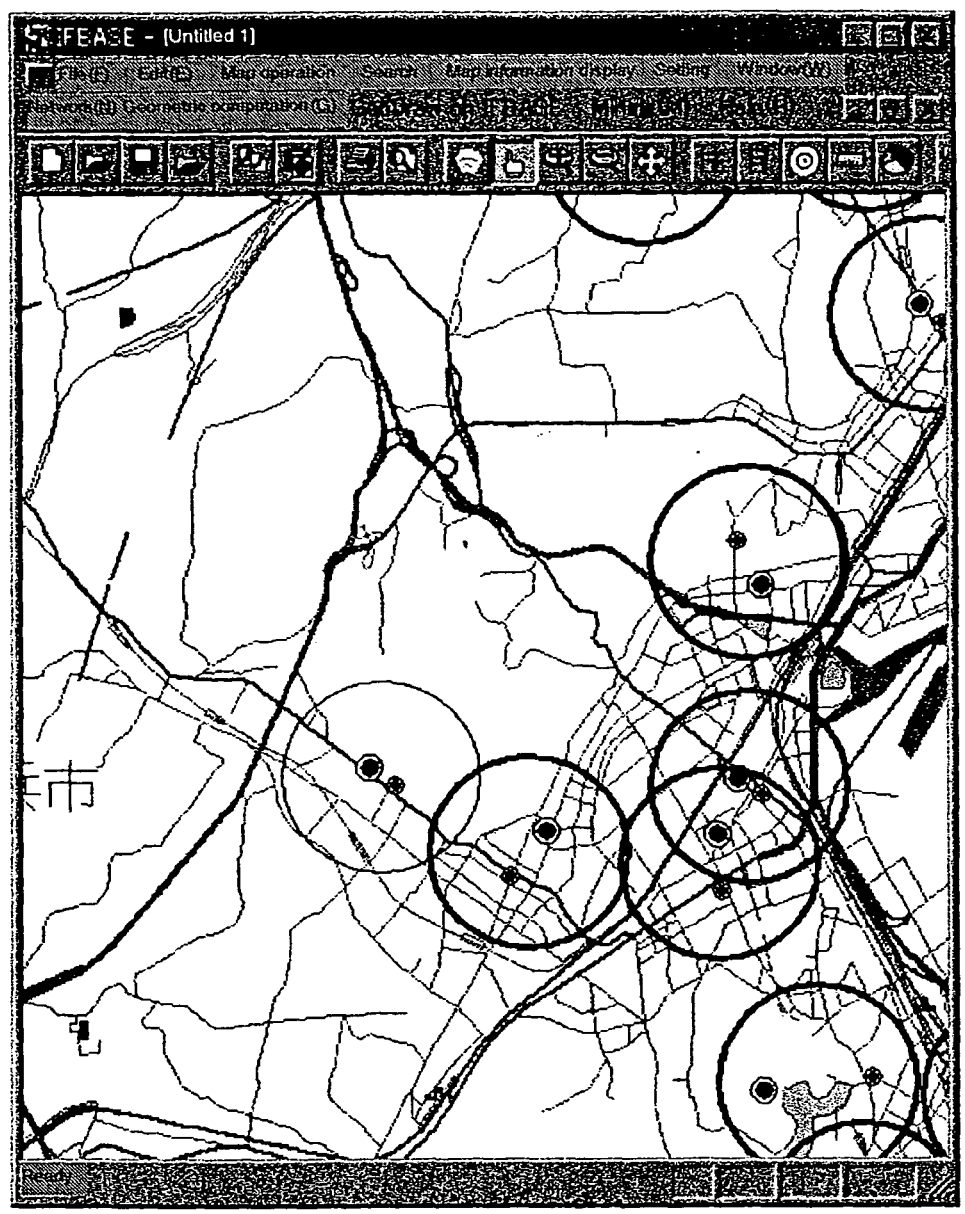

[Figure 18]
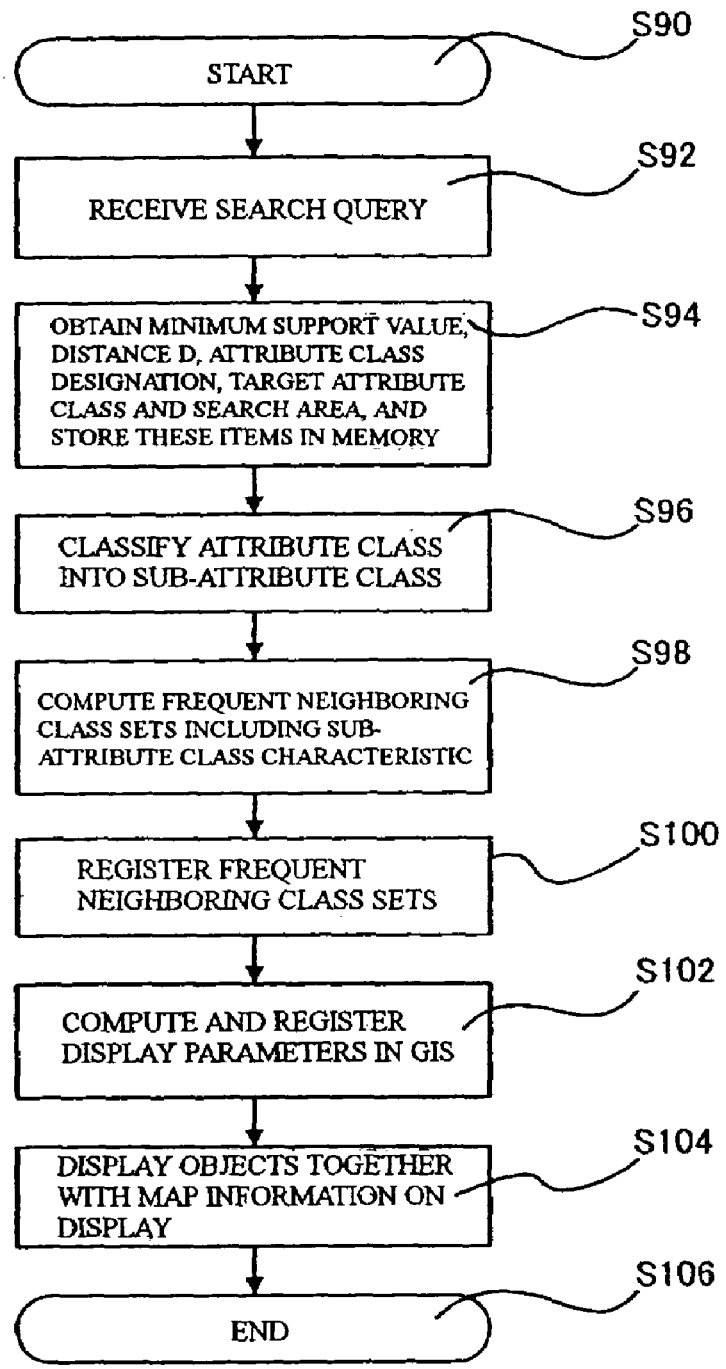

[Figure 19]
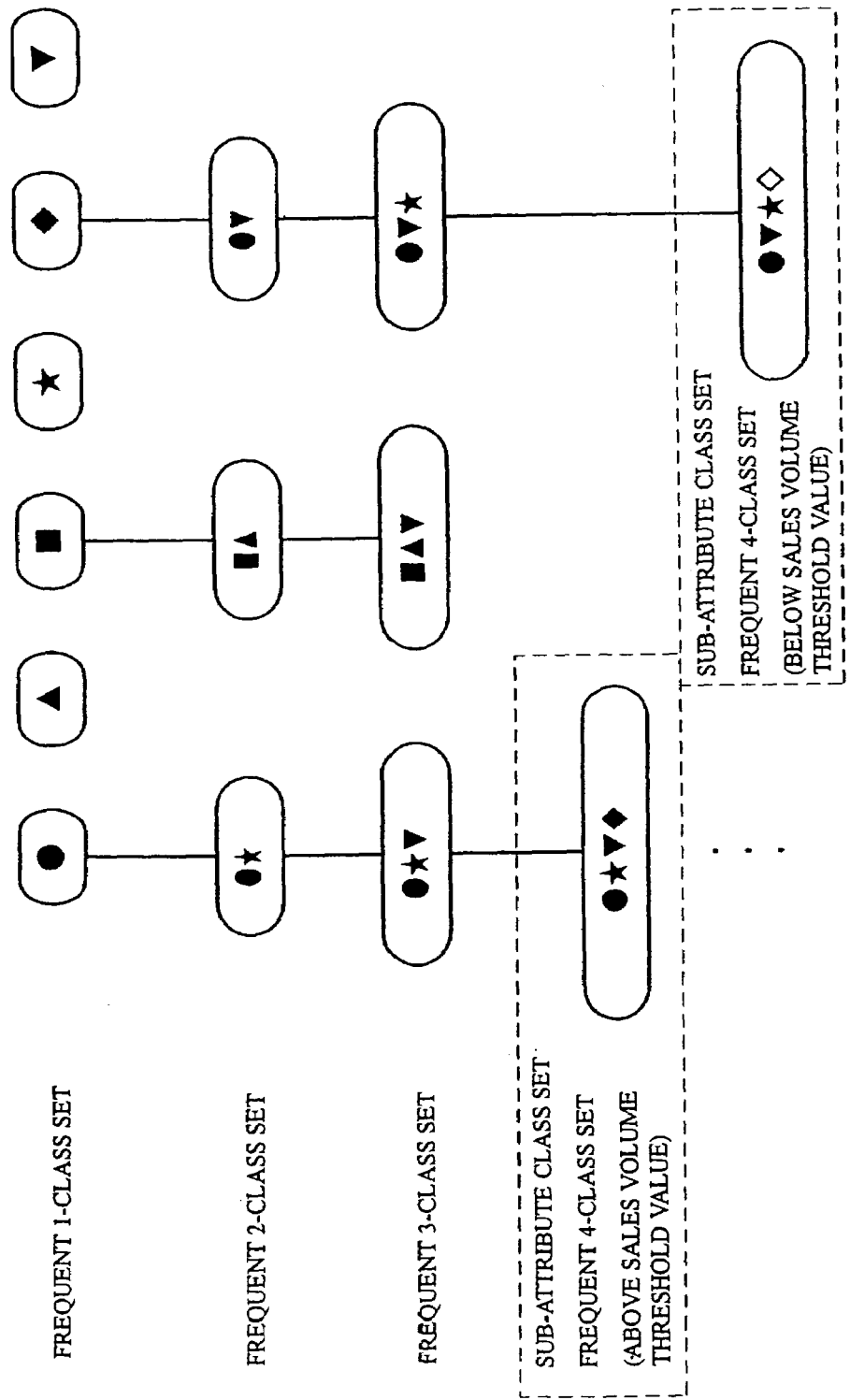

[Figure 20]

|  | SUB-ATTRIBUTE CLASS | | TOTAL NUMBER OF INSTANCES |
|---|---|---|---|
|  | HIGH-SALES BRANCH | LOW-SALES BRANCH |  |
| NUMBER OF INSTANCES OF FREQUENT NEIGHBORING CLASS SETS INCLUDING A | x | y | x+y |
| NUMBER OF INSTANCES OF FREQUENT NEIGHBORING CLASS SETS NOT INCLUDING A | n1−x | n2−y | N−(x+y) |
| TOTAL | n1 | n2 | N |

[Figure 21]
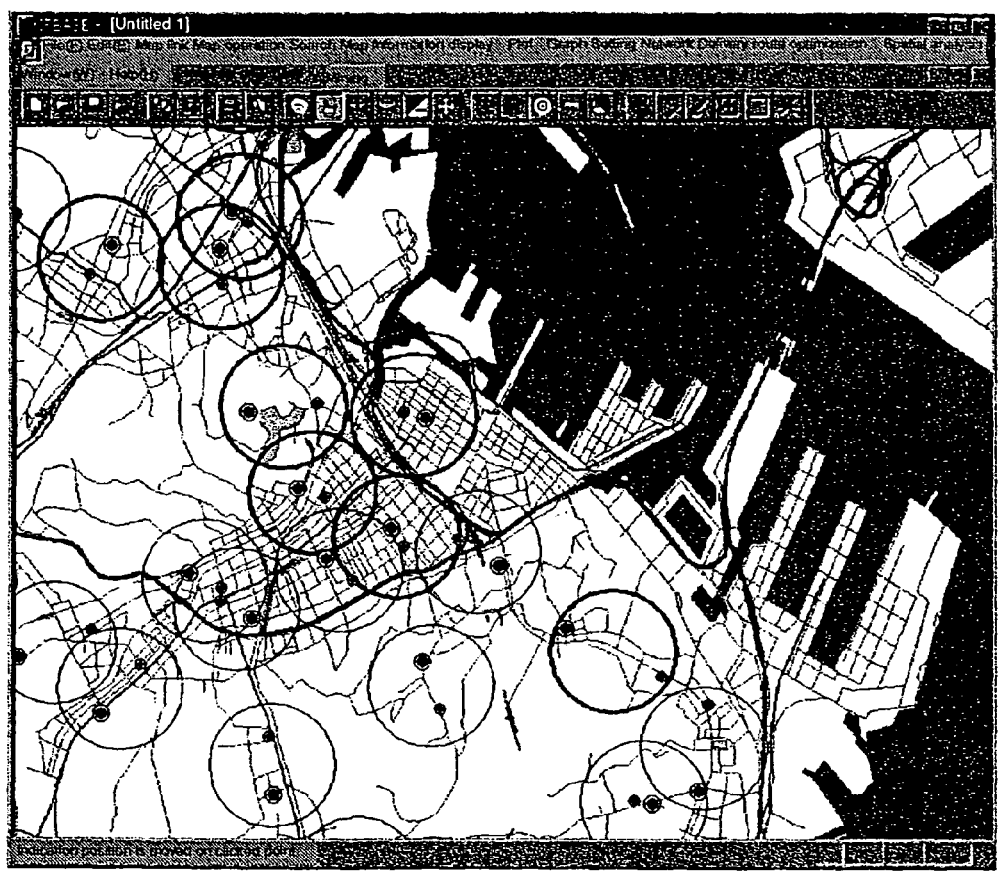

[Figure 22]
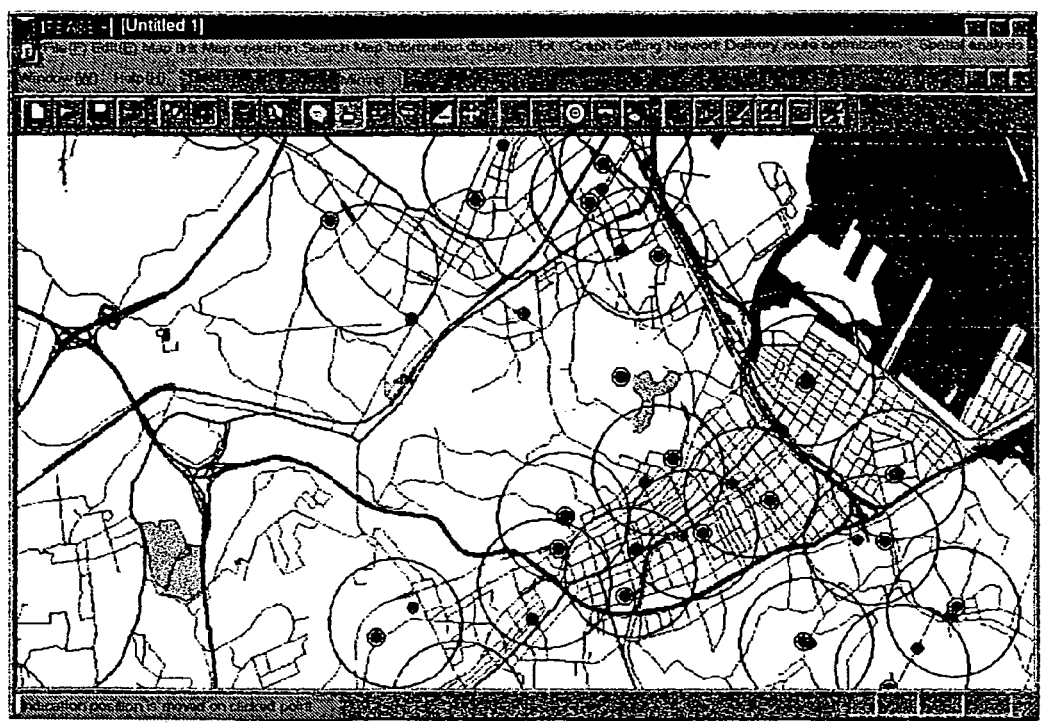

[Figure 23]
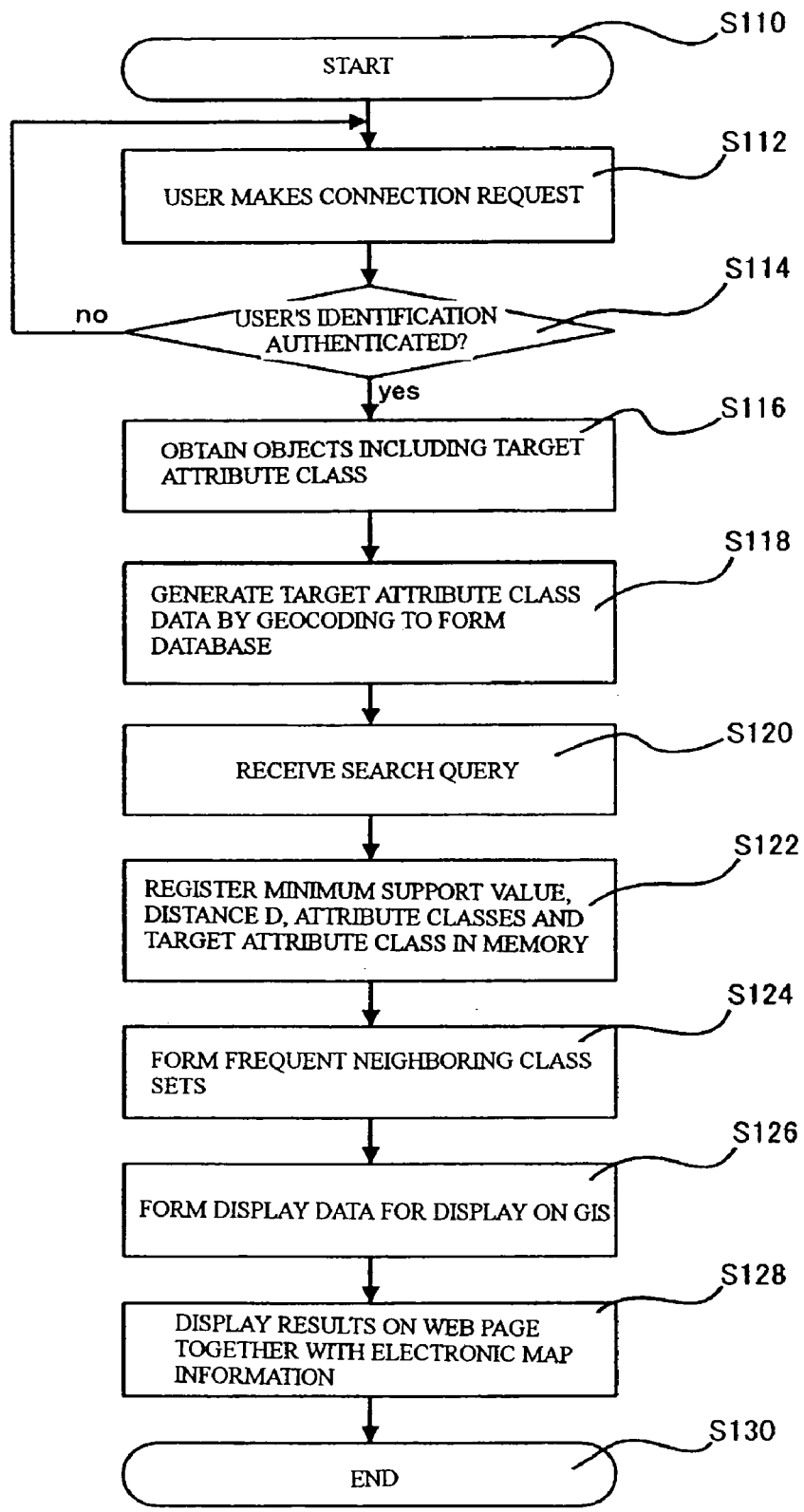

[Figure 24]
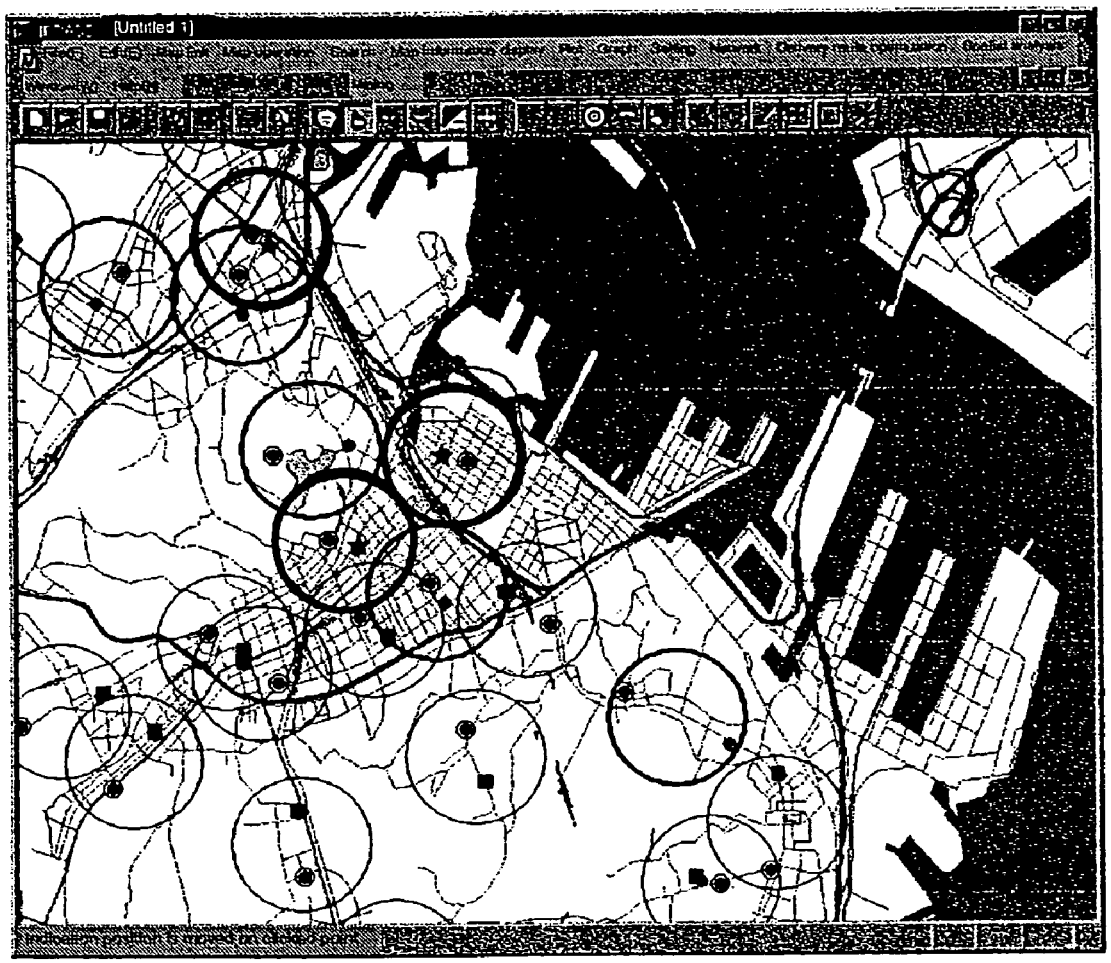

[Figure 25]
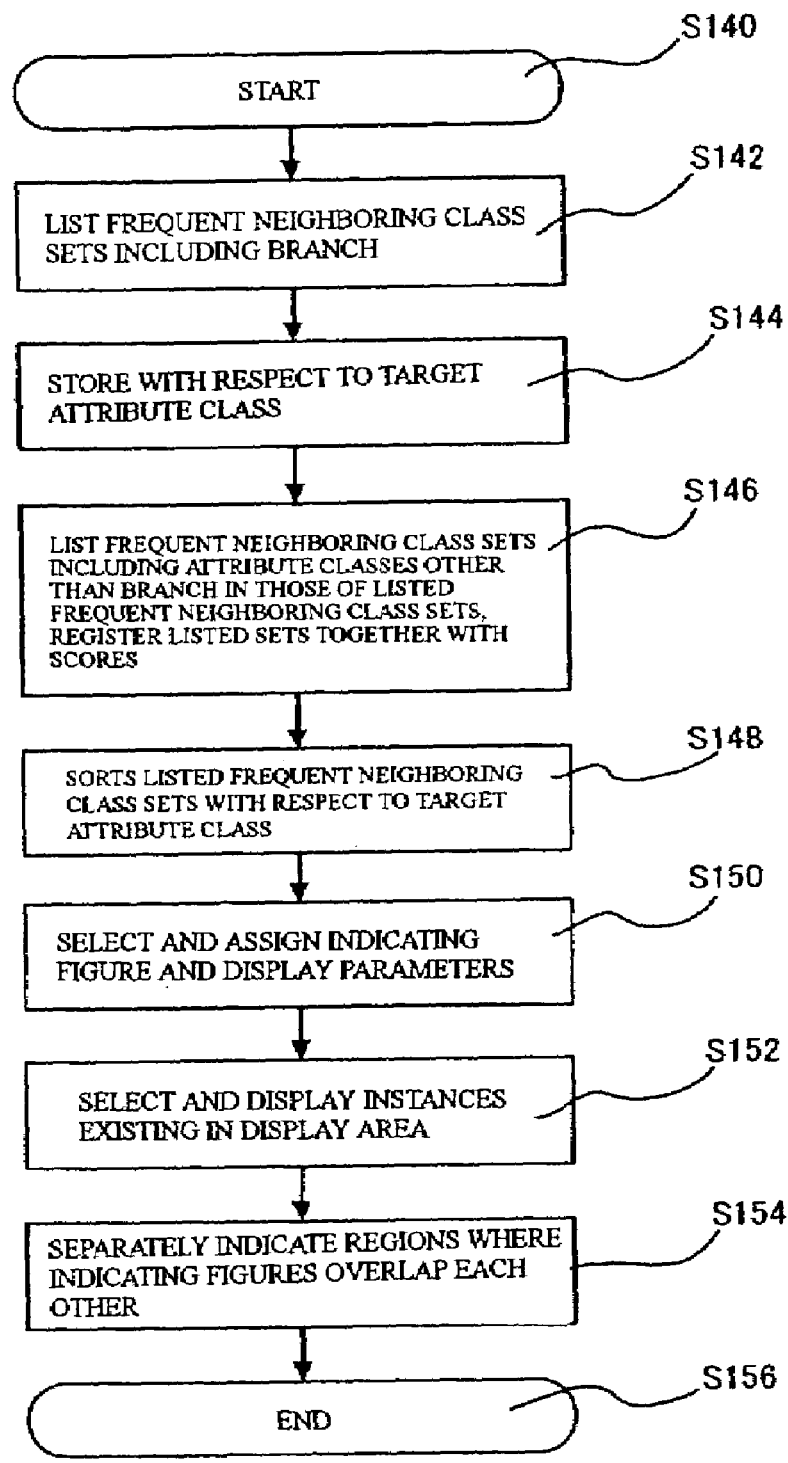

[Figure 26]
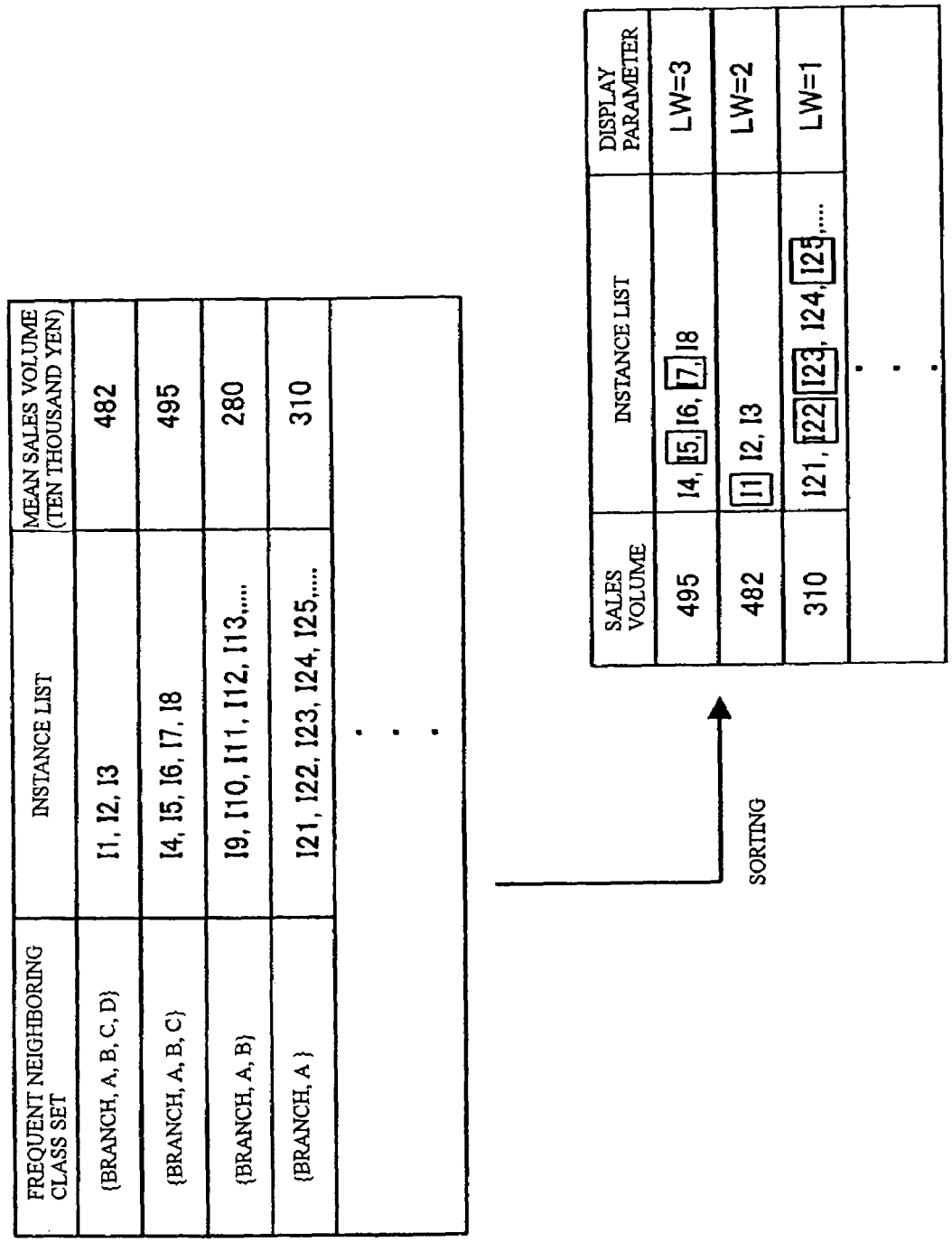

[Figure 27]
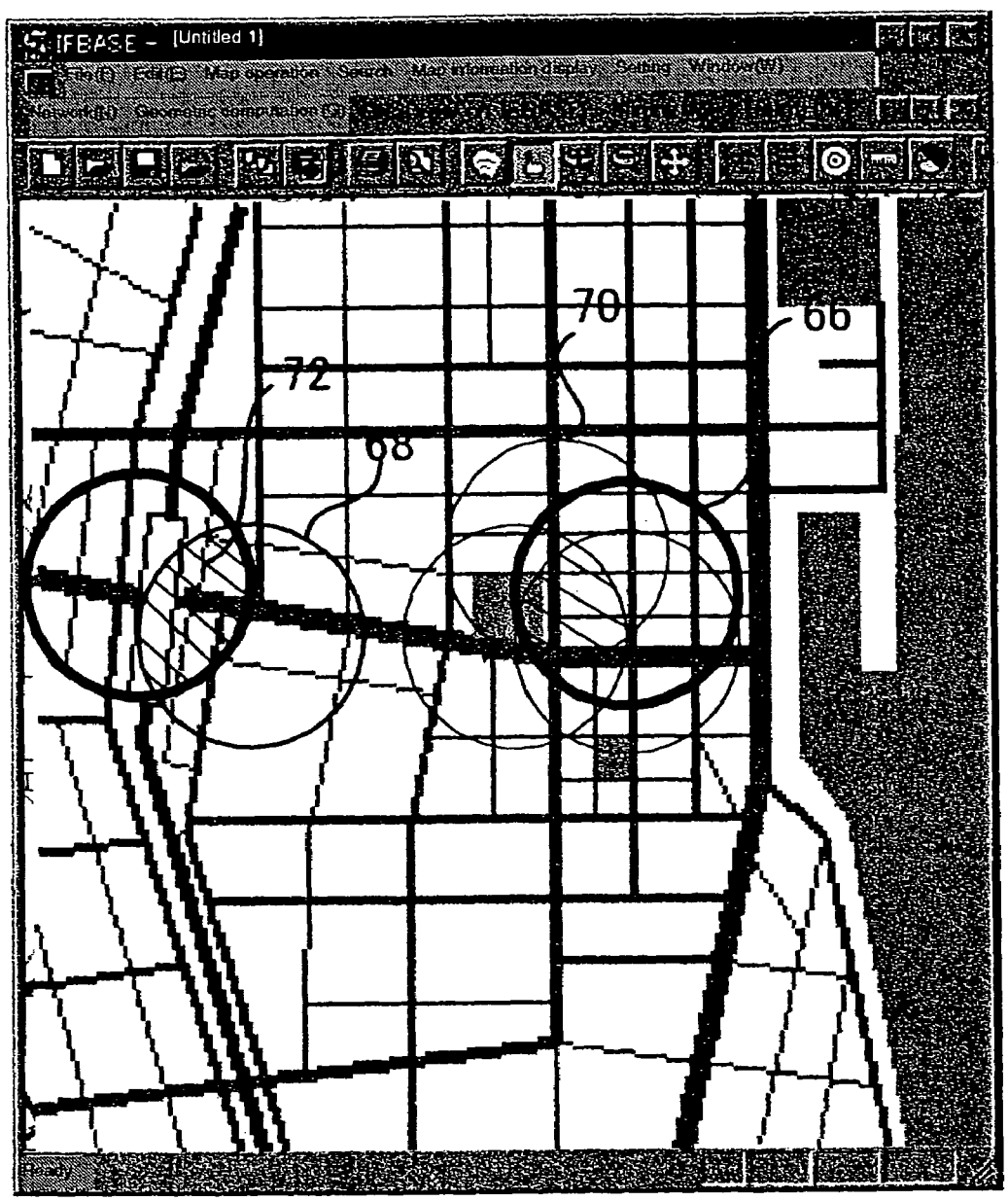

INFORMATION DISPLAY

CLAIM FOR PRIORITY

This application claims priority from Japanese Patent Application No. 2002-260236, filed on Sep. 5, 2002, and which is hereby incorporated by reference as if fully set forth herein.

1. Field of the Invention

The present invention generally relates to the display of information, and more particularly, to the display of information considering spatial relations between pieces of information.

2. Background of the Invention

With the proliferation of information technology (IT)-based services and business operations, the infrastructure for computerizing people's activities including purchase of goods and various social phenomena has been improved. Under such a circumstance, data mining techniques for finding a pattern of frequent reference to data in a large amount of accumulated data (hereinafter referred to as "frequent pattern") and effectively utilizing the finding for business have been developed. Such techniques have revolutionized many sorts of business. Many of data mining techniques heretofore proposed are intended to treat relations stored in a relational table and typical logs (POS transactions, etc.) and to obtain frequent patterns and optimum values.

In recent years, techniques for mining of a large amount of text described in a language and nonstructural or half structural data such as Web data have been proposed to meet an increasing number of business needs. Such techniques are referred to as "text mining", "Web mining" or the like in the following documents: Sukagawa et al., "Text mining, finding knowledge by automatic analysis of large amount of document data", Information Processing, Vol. 40, No. 4, pp. 358–364 (April 1999); Arimura et al., "Efficient discovery of optimal word association patterns in large text database", New Generation Computing, Vol. 17, pp. 49–60, 2000; Matsuzawa et al., "Mining structured association patterns from database", Proceedings of PAKDD-2000 conference, pp. 233–244, April 2000, etc. While these text mining and Web mining techniques enable mining of documents, so-called "spatial data mining" can be mentioned as one of mining techniques supposed to become important in future.

Various studies have been made about spatial data mining. For example, techniques relating to spatial data mining are disclosed in the following documents: Raymond et al., "Efficient and effective clustering methods for spatial data mining", Proceedings of the 20th International Conference on Very Large Data Base, VLDB, pp. 144–155, 1994; Koperski et al., "Discovery of spatial association rules in geographic information database", Proceedings of the 4th International Symposium on Advances in Spatial Database, SSD, Vol. 951 of Lecture Notes in Computer Science, LNCS, pp. 47–66, Springer-Verlag, 1995. Databases produced in recent years ordinarily include attributes indicating spatial positions such as addresses, and it is thought that spatial data mining will make it possible to obtain more important findings in information search. Conventional data mining techniques, however, treat spatial data such as addresses as a simple character sequence and cannot be said to have suitably utilized spatial meanings in data stored in a database. It is expected that the need for finding a pattern (spatial pattern) appearing frequently in a spatial content will increase in various fields, e.g., in the field of area marketing. It is also expected that the number of large-scale databases containing spatial information will increase with the development of the infrastructure for mobile computation and the development of position information services or businesses.

SUMMARY OF THE INVENTION

The present invention describes generally an information display and method in which potential meanings of spatial data in data stored in a database are extracted to provide users with value-added information. The present invention performs spatial data mining in such a manner that objects including addresses, etc., are regarded as points existing spatially and spatial mutual relations between the objects are considered. According to the present invention, position information on the relative positions of objects is used and relations between the position information and predetermined attribute information independent of the position information are obtained and registered. The predetermined attribute information is provided to a user together with map information through a display screen by using Geographic Information System (GIS) software. Position information on the relative positions of the objects in a database and the attribute information having certain relations with the position information are related to the objects to achieve advanced information display.

More specifically, according to the present invention, frequent neighboring class sets are formed by using the object position information contained in the database. A frequent neighboring class set can be defined as a set which is one of sets of objects existing within a user-input distance range and including a user-designated attribute information (hereinafter referred to as "attribute class") in attribute classes forming records in the database, and of which at least a certain number of instances exist. The objects constituting each instance of the frequent neighboring class set include a user-selectable target attribute class, e.g., sales volume, a kind of service, the number of accesses, or the number of users other than the position information. If each of the instances of the frequent neighboring class set is ranked or scored with respect to the target attribute class by using a predetermined criterion, a tendency of the target attribute class not due to position information about one object in a single state but due to positional relations between the objects can be determined.

According to the present invention, there is provided an information display system for making a computer display objects including position information on an electronic map, the information display system including: a database in which objects including position information and attribute information different from the position information are stored; an electronic map storage section in which the electronic map is stored; a set forming section which forms at least a certain number of sets of objects positioned in proximity with each other and including a set of objects by selecting the objects including a certain number of designated sorts of the attribute information within a predetermined distance; an arrangement for selecting the objects contained in each of the sets by locating position coordinates in the electronic map on which display is performed, displaying the selected objects according to the designated attributes of the selected objects while assigning an indicating figure corresponding to the pair of the objects, and designating position coordinates for the objects and the indicating figure to be displayed; and an arrangement for placing the objects and the indicating figure on the electronic map by using the designated position coordinates.

In the present invention, the designation method may include an arrangement for determining, by using the predetermined distance, the size of the indicating figure as such a size that the objects to be displayed are contained inside the area defined by the indicating figure, and an arrangement for changing display parameters for the indicating figure by using a threshold value with respect to a target attribute class. The designation method in the present invention may include an arrangement for determining the size of the indicating figure according to the scale of the electronic map, and the placement method may locate the boundary of the indicating figure on the electronic map and place a portion of the indicating figure contained in the electronic map on which the display is performed.

According to the present invention, there is provided a server used in an information display system for making a computer display objects including position information on an electronic map, the server being connected to a network, the server including: a database in which objects including position information and attribute information different from the position information are stored; an electronic map storage section in which the electronic map is stored; a search condition acquisition section which obtains conditions including a predetermined distance and designation of attribute information from a search query via the network and makes the server store the obtained conditions; a set forming section which forms at least a certain number of sets of objects positioned in proximity with each other and including a set of objects by selecting the objects including a certain number of designated sorts of the attribute information within the predetermined distance obtained from the search query; an arrangement for selecting the objects contained in each of the sets by locating position coordinates in the electronic map on which display is performed, displaying the selected objects according to the designated attributes of the selected objects while assigning an indicating figure corresponding to the pair of the objects, and designating position coordinates for the objects and the indicating figure to be displayed; and an arrangement for generating search results including the position coordinates of the objects and the indicating figure on the electronic map by using the designated position coordinates.

According to the present invention, there is provided an information display method for making a computer display objects including position information on an electronic map, the method including: a step of forming, from a database in which objects including position information and attribute information different from the position information are stored, at least a certain number of sets of objects positioned in proximity with each other and including a set of objects by selecting the objects including a certain number of designated sorts of the attribute information within a predetermined distance; a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure corresponding to the pair of the objects, and designating position coordinates for the objects and the indicating figure to be displayed; and a step of placing the objects and the indicating figure on the electronic map by using the designated position coordinates, wherein the designation step includes a step of determining, by using the predetermined distance, the size of the indicating figure as such a size that the objects to be displayed are contained inside the area defined by the indicating figure, and a step of changing display parameters for the indicating figure by using a threshold value with respect to a target attribute class.

According to the present invention, there is provided a server control method for making a server display objects including position information on an electronic map via a network, the method including: a step of receiving a search query via the network, obtaining conditions including a predetermined distance and designation of attribute information from the search query, and making the server store the obtained conditions; a step of forming, from a database in which objects including position information and attribute information different from the position information are stored, at least a certain number of sets of objects positioned in proximity with each other and including a set of objects by selecting the objects including designated sorts of the attribute information within the obtained predetermined distance; a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure in an indicating form corresponding to the pair of the objects, and designating position coordinates for the objects and the indicating figure to be displayed; and a step of generating search results including the placement of the objects and the indicating figure on the electronic map by using the designated position coordinates.

According to the present invention, a program storage device readable by machine, tangibly embodying a program of instructions executable by the machine to peform a method for displaying objects including position information on an electronic map, is provided, said method comprising the steps of forming, from a database in which objects including position information and attribute information different from the position information are stored, at least a certain number of sets of objects positioned in proximity with each other and including a set of objects by selecting the objects including a certain number of designated sorts of the attribute information within a predetermined distance; a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure corresponding to the pair of the objects, and designating position coordinates for the objects and the indicating figure to be displayed; and a step of placing the objects and the indicating figure on the electronic map by using the designated position coordinates, wherein the designation step includes a step of determining, by using the predetermined distance, the size of the indicating figure as such a size that the objects to be displayed are contained inside the area defined by the indicating figure.

According to the present invention, a program storage device readable by machine, tangibly embodying a program of instructions executable by the machine to peform a method for displaying objects including position information on an electronic map, is provided, said method comprising the steps of of receiving a search query via the network, obtaining conditions including a predetermined distance and designation of attribute information from the search query, and storing the obtained conditions in the server; a step of forming, from a database in which objects including position information and attribute information different from the position information are stored, at least a certain number of sets of objects positioned in proximity with each other and including a set of objects by selecting the objects including designated sorts of the attribute information within the obtained predetermined distance; a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure corresponding to the pair of the objects, and designating position coordinates for the objects and the indicating figure to be displayed; and a step of generating search results including the objects and the indicating figure on the electronic map by using the designated position coordinates.

According to the present invention, a program storage device readable by machine, tangibly embodying a program of instructions executable by the machine to peform a method for displaying objects including position information on an electronic map, is provided, said method comprising the steps of of forming, from a database in which objects including position information and attribute information different from the position information are stored, at least a certain number of sets of objects positioned in proximity with each other and including a set of objects by selecting the objects including a certain number of designated sorts of the attribute information within a predetermined distance; a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure in an indicating form corresponding to the pair of the objects, and designating position coordinates for the objects and the indicating figure to be displayed; and a step of placing the objects and the indicating figure on the electronic map by using the designated position coordinates, wherein the designation step includes a step of determining, by using the predetermined distance, the size of the indicating figure as such a size that the objects to be displayed are contained inside the area defined by the indicating figure, and a step of changing display parameters for the indicating figure by using a threshold value with respect to a target attribute class.

According to the present invention, a program storage device readable by machine, tangibly embodying a program of instructions executable by the machine to peform a method for displaying objects including position information on an electronic map, is provided, said method comprising the steps of receiving a search query via the network, obtaining conditions including a predetermined distance and designation of attribute information from the search query, and storing the obtained conditions in the server; a step of forming, from a database in which objects including position information and attribute information different from the position information are stored, at least a certain number of sets of objects positioned in proximity with each other and including a set of objects by selecting the objects including designated sorts of the attribute information within the obtained predetermined distance; a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure corresponding to the pair of the objects using a threshold value for a target attribute, and designating position coordinates for the objects and the indicating figure to be displayed; and a step of generating search results including the objects and the indicating figure on the electronic map by using the designated position coordinates.

According to the present invention, there is provided a graphical user interface system for making a computer display position information by displaying objects including the position information on an electronic map, the graphical user interface system including: a database in which objects including position information and attribute information different from the position information are stored; an electronic map storage section in which the electronic map is stored; a set forming section which forms at least a certain number of sets of objects positioned in proximity with each other and including a set of objects by selecting the objects including a certain number of designated sorts of the attribute information within a predetermined distance; an arrangment for reading out the electronic map which is stored in the electronic map storage section and on which display is performed, selecting the objects contained in each of the sets by locating position coordinates in the electronic map, displaying the selected objects according to the designated attributes of the selected objects while assigning an indicating figure corresponding to the pair of the objects using a threshold value for a target attribute, and designating position coordinates for the objects and the indicating figure to be displayed; and arrangment for displaying search results including a plurality of the objects and the indicating figure on the electronic map by using the designated position coordinates.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

FIG. 1 shows an embodiment of a neighboring class set in the present invention;

FIG. 2 is a diagram showing an embodiment of attribute classes used in the present invention;

FIG. 3 is a diagram showing the configuration of a neighboring class set in the present invention and an expression for description of a neighboring class set used in the present invention;

FIG. 4 is a diagram schematically showing processing for forming a frequent neighboring class set;

FIG. 5 is a flowchart schematically showing formation of a frequent neighboring class set in the present invention;

FIG. 6 is a diagram schematically showing a frequent neighboring class set used in the present invention;

FIG. 7 is a diagram showing pseudo codes for executing processing for forming a frequent (k+1)-neighboring class set from a frequent k-neighboring class set suitably used in the present invention;

FIG. 8 is a diagram schematically showing the configuration of an information display system of the present invention;

FIG. 9 is a functional block diagram showing the functions of the information display system shown in FIG. 8;

FIG. 10 is a diagram showing another an embodiment of the information display system of the present invention;

FIG. 11 is a flowchart showing processing in a first embodiment of the information display method of the present invention in which the information display method is carried out in the information display system shown in FIG. 9;

FIG. 12 is a diagram for explaining as an embodiment a case of application of the processing in step S38 shown in FIG. 11 to the number of accesses from cellular phones to an information service;

FIG. 13 is a diagram for explaining processing in a case where the position coordinates of objects included in frequent neighboring class sets formed by the processing described above with reference to FIG. 12 and user-input distance D are indicated in a display window;

FIG. 14 is a diagram showing an embodiment in which circle corresponding to instances of the frequent neighboring class set { time table, ticket}, the positions of objects, and map data are displayed together;

FIG. 15 is a flowchart showing processing when instances of frequent neighboring class sets formed in accordance with the present invention and the objects constituting the instances are displayed together with map data;

FIG. 16 is a flowchart showing processing in a second embodiment of the information display method of the present invention;

FIG. 17 is a diagram showing an embodiment of a GUI displayed on the display screen in the second embodiment of the information display method of the present invention;

FIG. 18 is a flowchart showing processing in a third embodiment of the information display method of the present invention;

FIG. 19 is a diagram schematically showing the configuration of frequent neighboring class sets formed in the third embodiment of the information display method of the present invention;

FIG. 20 is a diagram showing details of the configuration of a sub-attribute class in a fourth embodiment of the information display method of the present invention;

FIG. 21 is a diagram showing the results of extraction of positional regularity by using sub-attribute class classification;

FIG. 22 is a diagram showing the results of examination of the relationship between instances of a frequent neighboring class set formed by designating attribute classes {tearoom, bakery} as a frequent neighboring class set and the sales volume of the bakery;

FIG. 23 is a diagram showing processing for executing the information display method of the present invention via a network according to a fifth embodiment of the information display method of the present invention;

FIG. 24 is a diagram showing an embodiment of the display window opened to a user via a network in the fifth embodiment of the information display method of the present invention;

FIG. 25 is a flowchart showing processing in the sixth embodiment of the information display method of the present invention;

FIG. 26 is a diagram showing an embodiment of ranking of the instances formed by processing shown in FIG. 25; and FIG. 27 is a diagram showing the state of display of position information obtained by processing shown in FIGS. 25 and 26.

DETAILED DESCRIPTION OF THE PREFERRED EMBODIMENTS

Frequent Neighboring Class Set

A neighboring class set defined according to the present invention is a set of objects or a set of objects (instance) produced by classifying attribute classes other than position information contained in records in a database on the basis of the positional proximity of the attribute classes. FIG. 1 shows an example of a neighboring class set in an embodiment of the present invention. For example, according to the present invention, a neighboring class set is given by being superimposed on map information produced by using Geographic Information System (GIS) software on a computer display, as shown in FIG. 1. In the embodiment shown FIG. 1, a map centered on a railroad station "S" is displayed in a display window. On the map displayed in the window, the displayed form of information on the positions of objects contained in the frequent neighboring class set is changed with respect to attribute classes other than the information on the positions of the objects.

In the present invention, position information can be constituted by information items such as latitude, longitude and altitude. Attribute classes in the present invention are sorts of business, city districts, sales volume, the number of accesses or the number of users, and so on, e.g., kinds of information provision service accessed at object points, factories, convenience stores, recreation facilities, fitness facilities, stations, various kinds of retail store, and residential zones. More specifically, display of information according to the present invention is as described below with reference to FIG. 1. The displayed states of objects shown in FIG. 1 are changed as an attribution class in correspondence with the names of services utilized by users. Symbol 1 in FIG. 1 represents an attribute class indicating an access made by a particular person from a point to an information provision service for reference to a time table. Each solid filled triangle represents an attribute class accessed, e.g., ticket reservation. Symbol n represents a point where an access was made to an attribute class constituted by a service name, e.g., a weather forecast information provision service. Circle "CIR" in FIG. 1 indicates that at least two of the above-described attribute classes occurred in proximity to each other within a predetermined distance range. Information shown in FIG. 1 indicates, for example, that two attribute classes {time table, ticket reservation } among combinations of attribute classes occur frequently at points close to each other.

FIG. 2 shows an example of objects contained in a database used in an embodiment of the present invention. Objects shown in FIG. 2 are registered as a record in a database, and constituents of a record, e.g., a service name, the number of transmitted packets, etc., constitute attribute classes. Attribute classes thus formed are defined as information not including position information such as latitude and longitude. In the embodiment shown in FIG. 2, the database can be formed, for example, by using a log of accesses to various services made by users of cellular phones via carriers for the phones. For example, when a request for access through a cellular telephone to a predetermined service is made, the service name can be identified from data contained in a communication packet, e.g., a URL address on a Web page. Position information can be produced by determining the location of the receiving antenna through which transmission and reception are performed by the cellular phone. In the database shown in FIG. 2, attributes classes, such as transaction IDs relating to service requests made through the cellular phones, access points, names of services accessed, and the number of transmitted packets, are entered as records to form the database.

FIG. 3 shows the configuration of a neighboring class set in the present invention and an expression for description of a neighboring class set used in the present invention. As shown in FIG. 3, a predetermined distance D is defined in the present invention and attribute classes 2, 4, 6, and 8 of a plurality of objects in a database, which attribute classes exist within the distance D, are registered as an instance of a neighboring class set. That is, the object having attribute classes 2, 4, 6, and 8 is an instance of a neighboring class set inside the region defined by the distance D. In FIG. 3, attribute classes including mutual positional relations, which classes are included in different objects, are shown in different forms. According to the present invention, the above-described neighboring class set is described as ({attribute class 1, attribute class 2, attribute class 3, attribute class 4, . . . attribute class m }, n), and the number of instances in which attribute classes 1 to m satisfy a positional proximity condition is defined as a support number n. For definition of the neighboring class set in accordance with the present invention, however, any description may be used instead of that shown above.

In the present invention, a frequent neighboring class set is defined as a neighboring class set having a support number n exceeding a predetermined number N input by a user among neighboring class sets defined as described above. In the present invention, the user-input predetermined value N is referred to as a minimum support value. A concrete example of the frequent neighboring class set will be described with reference to the embodiment shown in FIG. 1. In FIG. 1, "CIR" indicates objects constituting an instance of a frequent neighboring class set formed in the region defined by the user-designated distance D. the minimum support value N is 2 in the embodiment shown in FIG. 1, and the instance shown in FIG. 1 corresponds to a displayed form for a frequent neighboring class set shown in the following table 1.

TABLE 1

Frequent neighboring class set 1: ({time table, ticket reservation}, 4)
Frequent neighboring class set 2: ({time table, weather forecast}, 3)
Frequent neighboring class set 3: ({ticket reservation, weather forecast}, 2)
Frequent neighboring class set 4: ({time table, ticket reservation, weather forecast}, 2)

That is, with respect to the embodiments shown in FIGS. 1 to 3, it is shown that the attribute class that occurs most frequently with the highest positional proximity is {time table, ticket reservation}, {time table, weather forecast} follows it, and the combinations of attribute classes {ticket reservation, weather forecast} and {time, table, ticket reservation, weather forecast} occur with a lower frequency, but the value of this frequency is higher than the user-input minimum support value. A further detailed description will be made of the formation of frequently neighboring class sets used in the present invention.

Algorithm For Formation of Frequent Neighboring Class Set

A neighboring class set having k number of attribute classes among neighboring class sets in the present invention is defined as k-neighboring class set. A class set having a support number equal to or larger than the minimum support number N among k-neighboring class sets is defined as frequent k-neighboring class set. When k=1, only one attribute class is included and, therefore, the distance D cannot be defined. In this case, according to the present invention, in a particular embodiment, a set which includes a predetermined attribute class in the database and which appears as a number of objects equal to or larger than the minimum support number N is defined as a frequent 1-neighboring class set. The number of objects with respect to each class can easily be counted by scanning the database one time. A frequent 1-neighboring class set can therefore be obtained easily by computation using a conventional method.

In the present invention, a 2-class set, for example, is formed by combining two 1-class sets. FIGS. 4(*a*) and 4(*b*) are schematic diagrams showing this processing. In FIGS. 4(*a*) and 4(*b*), $_i$", etc., represent objects contained in the database. FIG. 4(*a*) shows the formation of a 2-neighboring class set, and FIG. 4(*b*) shows the formation of a 3-neighboring class set by adding another attribute class indicated by <to the 2-neighboring class set shown in FIG. 4(*a*). For example, in the embodiment shown in FIG. 4(*a*), two objects within the distance D among combinations of object $_i$ and object " are registered as an instance of a 2-neighboring class set.

Objects with a distance larger than the distance D are not registered as an instance, thereby enabling consideration of distance proximity in spatial data mining. In FIG. 4(*a*), objects within the distance D and registered as an instance of a 2-neighboring class set are indicated by 1 and n. A 3-neighboring class set can be formed in such a manner that one attribute class<other than the attribute classes constituting one 2-neighboring class set is sequentially combined with the one 2-neighboring class set, as shown in FIG. 4(*b*). More specifically, the distance between objects including attribute class<not contained in FIG. 4(*a*) and the centroid of an instance of a 2-neighboring class set is computed. In this computation, the centroid of objects constituting an instance already registered as a 2-neighboring class set is completed and these objects and an object <within the distance D from this centroid are registered as an instance of a 3-neighboring class set.

In FIG. 4(*b*), the objects registered as an instance of a 3-neighboring class set are indicated by a solid filled triangle, 1, and n, and the centroid positions of 2-neighboring class sets are indicated by a symbol "+". In the case shown in FIG. 4(*b*), any set including object<out of the distance range D is not included in 3-neighboring class sets, thus enabling consideration of distance D. Even in a case where the number of attribute classes is increased, the same method is used to form an m-neighboring class set corresponding to the number m of attribute classes designated by a user.

In the present invention, the number of instances of neighboring class sets of $k^3 2$ in particular may vary depending on the sequence of added attribute classes. In ordinary cases, however, identifying and registering instances of attribute classes formable as attribute class sets for data mining is more important than accurately computing the support number n. Therefore, the neighboring class set forming method described above with reference to FIGS. 4 can be used to speedily and efficiently form certain numbers of attribute classes forming neighboring class sets.

Processing For Forming Frequent Neighboring Class Sets

FIG. 5 shows a flowchart for outlining the formation of frequent neighboring class sets in accordance with the present invention. As shown in FIG. 5, processing for forming neighboring class sets in accordance with the present invention is started from step S10, and the maximum distance D between neighboring objects and the minimum support value N are set in step S12. Subsequently, in step S14, computation for frequent k-neighboring class sets when k=1 (frequent 1-neighboring class set) is performed by the minimum support value N. In step S16, computation results are registered in a suitable storage unit such as a hard disk or a memory.

Thereafter, in step S18, k is incremented. In step S20, frequent k-class sets with respect to $k^3 2$ are successively formed, for example, by using the method described in the document: Rakesh et al., "Fast algorithms for mining association rules", Proc. of VLDB Conference, pp. 487–499, 1994, and are registered in the recording unit. In step S22, a determination is made as to whether the number of frequent k-class sets is 1 or less. If the number of frequent k-class sets is 1 or less (yes), the process moves to step S24 and ends immediately. If the number of frequent k-class sets >1 (no), the process returns to step S18, k is incremented, and the processing is repeatedly executed until the maximum number of attribute classes is reached, thereby forming and registering frequent neighboring class sets. The process ends in step S24.

Thus, frequent neighboring class sets hierarchically arranged from a frequent 1-neighboring class set to a frequent k-neighboring class set are formed. In the present invention, attribute classes can be set by user input and it is therefore possible to form frequent neighboring class sets containing only attribute classes designated by a user. FIG. 6 schematically shows the configuration of a group of frequent neighboring class sets used in the present invention, for example, with respect to a case where k=4 is set and 4-neighboring class sets are formed. In the present invention, as mentioned above, the member number n of a frequent neighboring class set when k=1 may vary depending on which attribute class is set. However, identifying a group of formable attribute class sets is more important than accurately generating the member number n. Therefore, an attribute class selectable with respect to k=1 can be set as desired by considering the processing speed, etc.

FIG. 7 shows pseudo codes for executing processing for forming a frequent (k+1)-neighboring class set from a frequent k-neighboring class set suitably used in the present invention. A Voronoi diagram is formed with respect to the pseudo codes shown in FIG. 7 for the purpose of improving the efficiency of computation of the proximity by providing an index structure at the time of repeated computation for determination of which one of the position of objects of attribute classes other than that of one object is close to the position of this object. In the present invention, any of methods of forming a Voronoi diagram heretofore known can be used. If the efficiency of computation can be improved by some other processing, it is not necessary to perform processing for forming a Voronoi diagram. The above-described frequent neighboring class set forming method is organized as a software module installed in a computer system and is used in an information display system including a computer. An information display system for executing information display in accordance with the present invention will now be described.

Information Display System

FIG. 8 is a diagram schematically showing the configuration of an information display system in accordance with the present invention. The information system 10 shown in FIG. 8 is constituted by a computer 12, a display 14, input arrangement 16 such as a keyboard, a pointing arrangement 18 such as a mouse, and a database DB stored on a storage medium such as a hard disk. The computer 12 is constituted by a central processing unit (CPU) necessary for performing information display in accordance with the present invention, a memory, and an internal hard disk. A network interface for making a connection to another computer by using a network such as a LAN, a WAN or the Internet may be included in the computer 12 if necessary. The computer 12 shown in FIG. 8 controls the database DB and updates or downdates a record in the database as required. The computer 12 has GIS software, electronic map data electronically formed (hereinafter referred to simply as "map data") and a GIS including display functions. The computer 12 is capable of displaying object position data contained in the database DB on display arrangement 14, for example by superimposing the position data on map data using a GIS software.

The computer 12 usable in the present invention may be a personal computer or a workstation, e.g., one which can incorporate a CPU such as PENTIUM® or a CPU compatible with PENTIUM®, and in which an operating system such as WINDOWS®, WINDOWS® NT, WINDOWS® XP, OS/2 (trademark: International Business Machines Corporation), AIX (trademark: International Business Machines Corporation), UNIX®, or Linux can operate.

When the computer 12 receives a search query, it obtains minimum support value N, distance D and attribute class designation data in data contained in the search query, reads out data contained in the database DB, and forms a group of frequent neighboring class sets conforming to the user's request. The formed frequent neighboring class sets can be registered in a hierarchically arranged group of frequent neighboring class sets, for example, in a suitable storage section provided in the computer 12.

FIG. 9 is a functional block diagram of the information display system shown in FIG. 8. As shown in FIG. 9, the information display system 10 of the present invention comprises the database DB, a search engine 20 for forming a group of frequent neighboring class sets and searching for information by processing data in the database DB, a display engine 22 for displaying search results, and a storage section 24 in which a group of formed frequent neighboring class sets are stored. A search query input section 26 is connected to the search engine 20 to enable a user to input a search query by interactive input using a keyboard or remote input via a network. Data found by search is superimposed on map data by being supplied to the display section 28 constituted by a CRT, an LCD, or a plasma display, thus displaying search to the user.

The search engine 20 shown in FIG. 9 is constituted at least by a search condition acquisition section 30 for obtaining search conditions from a search query, and a set forming section 32 for forming a frequent neighboring class set by using obtained conditions. An instance of a formed frequent neighboring class sets is registered in the storage section 24. A frequent neighboring class set is formed by using an attribute class designated by a registered user input.

The information display system of the present invention is constituted by the display engine 22. The display engine 22 is constituted mainly by an instance selection section 34 and a GIS display computation section 36. The instance selection section 34 selects instances and objects displayable in a display window from instances of frequent neighboring class sets formed with respect to a user-input search area and objects constituting the instances, and registers the selected instances and objects in a suitable memory or the like included in the computer 12. The GIS display computation section 36 reads out, for example, from the storage section 24, instances and objects selected and registered by the instance selection section 34 and assigns parameters necessary for display, i.e., parameters for designation of an indicating figure and forms in which the objects are to be displayed, to the selected instances and objects. The GIS display computation section 36 simultaneously reads out map data stored in an electronic map storage section 38 and stores the map data in a display buffer or the like together with the position coordinates of the objects to be displayed.

The display section 28 displays search results by placing map data in the display window as well as display parameters stored in the display buffer or the like. In the present invention, any attributes other than position information may be used as a target attribute class. Examples of such attribute classes are sales volume, the number of accesses, the amount of communication packets, the number of users, etc., which can be classified with respect to predetermined values in response to user designation. Also, any display parameters including parameters for display of a figure for indicating an instance region, e.g., a circle, a square or rectangle, and any other polygonal figure, and parameters for selecting the thickness of the lines of the indicating figure, a color for solid coloring of the indicating figure, hatching, luminance, pop-up display relating to a threshold value of a target attribute class, etc., can be used in the present invention if they enable a frequent neighboring class set to be displayed so that a user can discriminate this class set from other frequent neighboring class sets.

In the present invention, the attribute class of an object in an instance, designated by a user, can be displayed in any of various forms, for example, by using ○, Δ, , , *, ◇, ◎, or characters, changing the line color and the color for solid coloring, and effecting pop-up display as to whether the value of the target attribute class is higher or lower than the threshold value, while the display region is limited to avoid confusion with the indicating figure.

According to the present invention, it is preferred that a displayed figure be reliably related to an object in a frequent neighboring class set, and that the distribution of instances of a frequent neighboring class set be reflected in a map as precisely as possible in relation to the information on the map. In the present invention, therefore, the size of the indicating figure may be determined such that the distance D is indicated in accordance with the scale of the displayed electronic map as correctly as possible. Also, the size of the indicating figure may be determined such that an object included in an instance does not extend beyond the boundary of the region formed by the indicating figure, that is, the position coordinates of the object to be displayed are inside the indicating figure relative to the position coordinates determining the boundaries of the indicating figure. Also, objects to be displayed may be displayed in any size irrespective of the scale of the electronic map as long as the kinds of the objects can be discriminated from each other in the display window by a user, and as long as display of instances by the indicating figure is not obstructed by any of the objects. In the present invention, a method used to compare the boundary of the indicating figure and the position coordinates of an object to be displayed may be any of those heretofore known.

FIG. 10 is a diagram showing another embodiment of the information display system in accordance with the present invention. The information display system 40 shown in FIG. 10 is formed as a network system including a server 44 connected to a network 42, and a client 46 connected to the network 42. The server 44 controls a database DB in which objects for forming frequent neighboring class sets are stored. The server 44 may be constituted by a personal computer or workstation of essentially the same configuration as that described above with reference to FIG. 8 or 9. The server 44 is arranged to function as a search engine including at least a set forming section and a search section.

The network 42 in the present invention is, for example, the Internet. However, any one of other networks such as an ADSL network, optical communication network, a ground wave wireless network, satellite communication network, a LAN, and WAN capable of remote transmission and reception of information by communication using a suitable communication protocol, or a combination of any of such networks may alternatively be used. A communication protocol used for such communication may be TCP/IP or the like but is not limited to this.

The client 46 is placed at a user site. A user inputs to the client 46 a search query including minimum support value N, distance D, an attribute class to be considered, a target attribute class, and a search area where a frequent neighboring class set is to be formed. The input search query is converted into packet data to be sent to the address of the server 44 via a network interface included in the client 46. The search query sent over the network 42 is received by the server 44, temporarily held in a receiving buffer, and then analyzed to be used for formation of frequent neighboring class sets and information search by the server 44.

Information such as position information and attribute classes found by searching in response to the search query is formed as packet data including center coordinates of circles used as the figure for indicating instances of corresponding frequent neighboring class sets, data on attribute classes, and display parameters. This packet data is sent to the client that sent the search query. The client 46 receiving the search result packet data displays the received data by using suitable browser software and displays the search results in a state of being superimposed on map information.

In the embodiment shown in FIG. 10, a database 48 for storing business information for the user is connected to the client 46. This database 48 is not necessarily required in the present invention. However, the database 48 can be used to provide the server 44 with attribute classes which are not ordinarily held by the server 44, and which belong to company secrets, e.g., the number of users, sales data, and the number of accesses. When the server 44 receives objects transmitted from the user and including attribute classes including business secrets, it can perform, for example, the process of temporarily storing the objects in the receiving buffer and additionally registering them in a record, for example, as a new attribute class in the database DB. Also, the server 44 can form in the database DB special-purpose storage areas respectively related to users and form databases for the users in the special-purpose storage areas. In the embodiment of the present invention shown in FIG. 10, advanced information display for users can be achieved by including, as target data, data which is not ordinarily held by the server 44. In the present invention, information relating to business secrets held by a user may be stored on a storage medium such as a flexible disk, or a CD-ROM to be held in the server 44 in accordance with the present invention.

Details of Process According to Information Display Method

The information display method of the present invention will be described in more detail with respect to a concrete embodiment. FIG. 11 is a flowchart showing processing in a first embodiment of the information display method of the present invention in which the information display method is carried out in the information display system shown in FIG. 9. The information display method shown in FIG. 11 is started from step S30, and a search query input from a user is received in step S32. In the first embodiment of the information display method of the present invention, a search query can be input by a user in such a manner that the user inputs necessary information items one by one through an input arrangement such as a keyboard. In step S34, information items including minimum support value N, distance D, attribute classes to be included to form a frequent neighboring class set, a target attribute class to be searched for, and a search area are obtained from the input search query and are stored in a suitable memory such as a RAM to be used in processing subsequently performed.

In step S36, an access to the database DB is made by using the input minimum support value N, distance D, and attribute class information, the computer is made to execute the method shown in FIGS. 5 and 7 to form frequent neighboring class sets, and the frequent neighboring class sets are registered in a hierarchically arranged group in a storage arrangement such as a hard disk.

In step S38, the group of frequent neighboring class sets held in the storage arrangement are searched by using the attribute classes included in the search query and are assigned the center coordinates of the figure for indicating instances of the frequent neighboring class sets and the display parameters corresponding to the attribute classes.

In step S40, map data for display in the display window corresponding to the search area designated by the user is obtained from the GIS. In step S42, conversion of the position coordinates for display is made. The indicating figure, e.g., a circle or a rectangle is displayed by using the designated display parameters on the display section 28, and the objects constituting the instances of the frequent neighboring class sets are displayed by using the display forms corresponding to the attribute classes, thus presenting the search query results to the user. In step S42, the processing in the first embodiment ends.

FIG. 12 is a diagram for explaining as an embodiment a case of application of the processing in step S38 shown in FIG. 11 to the number of accesses from cellular phones to an information service. As shown in FIG. 12, objects are stored in the database DB as records of transaction IDs, the position coordinates of access points, kinds of service accessed, and the numbers of transmitted/received packets. In the embodiment shown in FIG. 12, there are three kinds of attribute classes: weather forecast, time table, and ticket reservation. In FIG. 12 is also shown an example of a request made by a user through a search query to form frequent neighboring class sets by using the above-described three kinds of attribute classes. It is also shown that the user has designated 2 as the minimum support value, and 100 m as distance D. In step S38, frequent neighboring class sets are computed from the given search query to form a group of frequent neighboring class sets. For example, the group of frequent neighboring class sets are formed as ({time table, ticket }, 4), ({time table, weather forecast }, 3), ({ticket reservation, weather forecast}, 2), and ({time table, ticket reservation, weather forecast}, 2). This group is stored in the storage section 24.

Table 2 shows another embodiment of frequent neighboring class sets found by the frequent neighboring class set forming method used in the present invention. In this case, a data base is formed in such a manner that "Yokohama-city, Kanagawa Prefecture" is designated by search area designation, position information is formed from addresses in a telephone directory by using the GIS, and kinds of business are obtained by using facility category information in the telephone directory. The distance D is set to 50 m and the minimum support value is set to 100. As shown in the following table 2, the numbers of stores relating to the kinds of business in the objects vary with respect to the kinds of business, and positional relations between the attribute classes can be mined through frequent neighboring class sets.

TABLE 2

Frequent neighboring class set 1({snack bar, sushi bar}, 996)
Frequent neighboring class set 2({bar, snack bar, pub}, 968)
Frequent neighboring class set 3({restaurant, snack bar, club, pub}, 785)
Frequent neighboring class set 4({restaurant, bar, snack bar, club, pub}, 604)
Frequent neighboring class set 5({restaurant, tearoom, bar, snack bar, club, pub}, 358)

According to the present invention, an instance of a frequent neighboring class set can be selected and displayed according to a search query by making a selection from the instances in the group of frequent neighboring class sets found in the above-described way, thus enabling mining of relative positional relations among objects and enabling advanced information display including display of relative positional relations.

FIG. 13 is a diagram for explaining processing in a case where the position coordinates of objects included in frequent neighboring class sets formed by the processing described above with reference to FIG. 12 and user-input distance D are indicated in a display window. For example, there are four instances of the frequent neighboring class set having elements designated by {time table, ticket} in FIG. 12. These four instances are indicated by circle 60 in FIG. 13. The diameter $D_1$ of this circle 60 is not necessarily set to a diameter D, as described below. Also, inside each circle 60 shown in FIG. 13, a point I at which an access to a time table was made and a solid filled triangle indicating a point at which an access to ticket reservation was made are indicated. These points exist within the user-input distance D. In FIG. 13, the user-input distance D and a circle 62 corresponding to the user-input distance D are indicated by the broken line.

When display of an instance according to the present invention is performed, if circle 60, for example, is used as an indicating figure as shown in FIG. 13, the center of circle 60 can be determined as centroid coordinates ($x_c$, $y_c$) obtained from the position coordinates of the objects contained in the circle.

The centroid position of each instance thus obtained is indicated by a symbol in FIG. 13. The value corresponding to the user-input diameter D can be used if there is no particular problem with use of this value. Also, the diameter $D_1$ of circle 60 may be set to a suitable value selected by considering the scale of the map and the size of the display, such that display on the display can be performed under optimized conditions when performed by using GIS software. In FIG. 13, an embodiment of display parameters for designating circle 60 is shown as ($x_c$, $y_c$, $C_{fD}$, LW). $C_{fD}$ is set as the diameter of circle 60 on the display screen about the user-input diameter D as close as possible, and is set to such a value as to completely contain the objects and a coefficient for enlargement/reduction used by considering the reduced scale on the display. LW is a variable for designating the line thickness or the kind of line used in the case of display including ranking or an operation for some other purpose.

Circle 60 designated as shown in FIG. 13 and the object points contained in circle 60 are displayed on the display screen by using GIS software in step S40. Thus, according to the present invention, the desired information shown in FIG. 14 can be displayed to the user. In FIG. 14, an embodiment in which circle 60 corresponding to instances of the frequent neighboring class set {time table, ticket}, the positions of objects, and map data are displayed together is illustrated for ease of explanation.

FIG. 15 is a flowchart showing processing performed in display engine 22 when instances of frequent neighboring class sets formed in accordance with the present invention and the objects constituting the instances are displayed together with map data. Processing shown in FIG. 15 is started from step S50 and a display window is formed on the display unit in step S52. In step S54, an area to be displayed in the display window is designated. Area designation in step S54 may be included in a search query. Alternatively, an area from which a user wishes to obtain information may be displayed in such a manner that a large-area map in a map of Japan for example is first displayed in the display window, and the map is graphically reduced step by step to finally set the desired area as an area displayable in the formed window, for example, on a scale of 1 to 50000 or 1 to 25000 or on a further reduced scale, as required. Further, the area to be displayed may be set in such a manner that the user inputs the latitude and longitude of the area to be displayed, and landmark names such as Yokohama Station, Tokyo Station and Tokyo Tower (trademark) according to user's need, the landmark names are converted into latitude and longitude by using geocoding or the like, and the user interactively inputs the scale while checking the area displayed in the display window.

In step S56, the centroid coordinates of instances contained in the displayed area determined in the display window are searched for and data on the instances are read out from the storage section or the like. At this time, only the objects contained in the displayed area may be searched for and displayed. In a modification of the present invention, part of a boundary portion of an indicating figure not contained in the displayed area may have an important meaning with respect to objects contained in the displayed area. In such a case, objects in an area set by using the size of the indicating figure, i.e., an area wider than the displayed area by a distance corresponding to the radius representing the size of the indicating figure or to half the length of the diagonal line or side of the indicating figure may be searched for.

In step S58, map data on the designated displayed area is read out from the database of the GIS and stored in a suitable buffer memory or the like. In step S60, the map data, the instances and the objects are displayed on the display screen in a superimposed state by using the assigned parameters to present the search results to the user. In step S62, the display processing ends. If in step S56 computation is also performed with respect to the corresponding objects in an area wider than the displayed area, processing for computing only the portion of the instance indicating figure contained in the display area and displaying this portion by superimposing this portion on the map data may be included. In the above-mentioned modification of the present invention, a prediction about an area adjacent to the user-selected displayed area can be made and, therefore, the search efficiency can be further improved.

FIG. 16 is a flowchart showing processing in a second embodiment of the information display method of the present invention. FIG. 16 shows an example of determination of the possibility of opening of a franchise store with respect to a branch of a convenience store. Processing in the second embodiment of the information display method of the present invention is started from step S70 and a search query from a user is received in step S72. In step S74, minimum support value N, distance D, attribute classes to be considered, a target attribute class and a search area contained in the search query are obtained and registered in a suitable memory.

In step S76, frequent neighboring class sets are formed by using the minimum support value N, distance D, attribute classes to be considered, and are registered in the storage arrangment. The frequent neighboring class sets are registered so that the target attribute class of objects contained in the frequent neighboring class sets can be referred to. For example, the objects contained in the frequent neighboring class sets may be designated as a pair of record identifiers for the objects to enable the reference. Alternatively, the position coordinates and request information data may be extracted from the record of each object to be registered as a pair (position coordinates and target attribute class data). For example, in a case where one of the frequent neighboring class sets is designated by ({branch, elementary school, station}, 3), record identifiers R (branch), R (school) and R (station) in the database DB in which the corresponding branch, elementary school and station data are registered may be registered as a pair (R (branch), R (school), R (station)). If each object is registered as a pair of (position coordinates, target attribute class data), the position coordinates of a branch and target attribute class data, expressed as ($x_1$, $y_1$, target attribute class), and the position coordinates of an elementary school and a station, respectively expressed as ($x_m$, $y_m$), and ($x_n$, $y_n$), may be combined to register ($x_1$, $y_1$, target attribute class data, $x_m$, $y_m$, $x_n$, $y_n$).

In step S78, sets containing "branch" of the convenience store are extracted from the registered frequent neighboring class sets; values of the target attribute class, e.g., sales volumes are averaged to obtain an average sales volume with respect to each frequent neighboring class set; and the class sets are assigned a display parameter for selecting, for example, the line width, the line color or hatching in decreasing order of average sales volume; and the display parameter is registered in a suitable buffer memory or the like. In step S80, display parameters are generated for each of the instance of the frequent neighboring class sets and are registered while being related to the instance and the objects in the frequent neighboring class set, thus forming display data. In this case, the center coordinates ($x_c$, $y_c$) for displaying each of the extracted instances of the frequent neighboring class sets are determined in the GIS, the diameter in the case of using a circle as an indicating figure is determined by $C_{fD}$, and display parameter LW corresponding to the rank of average sales volume is used, thereby registering the circle for display on GIS and the objects as ($x_c$, $y_c$, $C_{fD}$, $LW_n$, $x_{o1}$, $y_{o1}$, $c_{o1}$, $x_{o2}$, $y_{o2}$, $C_{o2}$ ...). In this expression, $x_{o1}$ and $y_{o1}$ are the position coordinates of one of the objects, $c_{o1}$, is a suitable parameter such as a JIS code or an ASCII code for display of the object.

In step S82, the circles obtained in step S80 are depicted in the display window and the objects of the instance contained in each circle are depicted, thereby displaying the position information with the average sales volume information on the display screen. In step S84, the processing in the second embodiment of the information display method of the present invention ends.

FIG. 17 shows an embodiment of a GUI displayed on the display screen in the second embodiment of the information display method of the present invention. As shown in FIG. 17, frequent neighboring class sets are indicated on the display screen by circles having different line widths corresponding to average sales ranks, and objects in the corresponding instances are displayed in the circles in different forms corresponding to attribute classes. A user can examine a plan for installing business facilities such as convenience stores by referring to the frequent neighboring class sets and the objects displayed as shown in FIG. 17.

FIG. 18 is a flowchart showing processing in a third embodiment of the information display method of the present invention. Processing shown in FIG. 18 is started from step S90 and a search query including minimum support value N, distance D, kinds to attribute parameters to be considered target attribute class, and a search area is input by a user in step S92. In step S94, the values of minimum support value N, distance D, attribute classes to be included for formation of frequent neighboring class sets, a target attribute class, etc., input as the search query are stored in a suitable memory such as a RAM to be used in processing subsequently performed.

In step S96, the target attribute class is further classified into a sub-attribute class by using a predetermined threshold value designated by the user. In step S98, frequent neighboring class sets are formed by accessing the database DB by using the stored minimum support value N, distance D, and attribute class information and by making the computer to execute the method shown in FIG. 7. In step S100, the frequent neighboring class sets including a hierarchical structure of the formed sub-attribute class are registered in a storage section comprising a suitable storage medium such as a hard disk or a RAM.

In step S102, the center coordinates ($x_c$, $y_c$) of circles and display parameters are assigned to instances of the frequent neighboring class sets stored as a group of frequent neighboring class sets in the storage arrangement, and are registered in the storage section.

In step S104, conversion of the position coordinates for display on the display screen is executed by using GIS software, and an indicating figure, e.g., a circle or a rectangle corresponding to the centroid coordinates ($x_c$, $y_c$) for display with respect to the distance obtained from the search query and objects to be displayed are displayed by using the designated parameters. In step S106, the processing in the third embodiment of the information processing method of the present invention ends.

In the third embodiment of the information processing method of the present invention, a frequent neighboring class set containing a target attribute class such as "convenience store" but not including an attribute class such as "branch name" in a convenience store chain is computed and registered, as described above. In the described embodiment, branches are classified with respect to whether the sales volume is equal to or larger than a user-designated threshold value or smaller than the threshold value, and a sub-attribute class is assigned to each branch. With respect to each of attribute classes belonging to the sub-attribute class, a frequent (k+1)-neighboring class set and a frequent (k+2)-neighboring class set are computed by using the algorithm described above with reference to FIG. 7 (k denotes a frequent neighboring class set obtained by removing the attribute class to be evaluated from the user-designated attribute classes to be considered).

FIG. 19 schematically shows the configuration of frequent neighboring class sets formed in the third embodiment of the information display method of the present invention. As shown in FIG. 19, in the third embodiment of the information display method of the present invention, frequent neighboring class sets to which "convenience store" is added are formed in a hierarchically arranged state in correspondence with sub-attribute classes. In the present invention, frequent neighboring class sets are formed one by one in correspondence with the sub-attribute classes formed as shown in FIG. 19 for example, thereby enabling frequent neighboring class sets to be selectively formed to be graphically displayed to a user.

A fourth embodiment of the information display method of the present invention will be described. Referring to FIG. 20 showing the fourth embodiment, a user wishes to determine whether there are instances relating to a particular object (e.g., a bakery having a franchise chain in the described embodiment) and including a certain rule with respect to the positional relation between attribute classes for classification of stores into stores of high sales volume and stores of low sales volume. Also in the fourth embodiment of the information display method of the present invention, frequent neighboring class sets including "branch" are first formed, as are those in the second embodiment. FIG. 20 shows details of the configuration of sub-attribute classes in the fourth embodiment of the information display method of the present invention. Referring to FIG. 20, a predetermined threshold value is set in the sales volume of a bakery using a franchise system for example, and the attribute class "branch of bakery" is further classified with respect to the sales volume into sub-attributed classes such as stores of a high sales volume relative to the threshold value and stores of a low sales volume relative to the threshold value.

In the embodiment shown in FIG. 20, class sets containing a bakery point class are extracted from the formed frequent neighboring class sets, the number of instances (x) including "branch of high sales volume" as a sub-attribute class is counted, and the number of instances (y) including "branch of low sales volume" as a sub-attribute class is counted. Then figures indicating the instances and objects points are displayed on the display screen in forms corresponding to the sub-attribute classification of the instances.

FIG. 21 shows the results of extraction of positional regularity by using sub-attribute class classification. In the example of this embodiment shown in FIG. 21, instances of a frequent 2-neighboring class set formed by designating attribute classes {junior high school, bakery} for example are selectively counted and displayed. In FIG. 21, the positions of objects including a target attribute class are indicated by 1. Objects encircled by a thick line are instances including objects including a high-sales attribute class. In FIG. 21, the instances of the frequent neighboring class set including objects of high sales volume (thick line) and the instances of the frequent neighboring class set including objects of low sales volume (thin line) are displayed with substantially the same frequencies with respect to an area larger than the window area. That is, sub-attribute classification of instances of the frequent neighboring class set {junior high school, bakery} performed with respect to the bakery sales volume as shown in FIG. 21 is of substantially no significance. That is, in the example of the embodiment shown in FIG. 21, information indicating that junior high schools in the vicinity of bakery stores do not substantially influence the bakery sales volume can be provided to the user.

FIG. 22 shows an example of this embodiment in which a frequent neighboring class set is formed by designating attribute classes {tearoom, bakery } and the relationship between instances of the frequent neighboring class set and the sales volume of the bakery is examined by the same processing as that described above. In FIG. 22, only instances of the frequent neighboring class set including a sub-attribute class for branches of low sales volume are indicated by circles. As shown in FIG. 22, most of the branches of the bakery near tearooms do not have the desired sales volume. That is, from the results shown in FIG. 22, information indicating that in a case where a bakery is opened near a tearoom, it is difficult to obtain the sales volume expected from the bakery and that the bakery and the tearoom are in a sort of competition with each other can be graphically displayed to the user.

FIG. 23 is a diagram showing processing for performing information display via a network according to a fifth embodiment of the information display method of the present invention. Processing in the fifth embodiment of the method of the present invention shown in FIG. 23 is started from step S110, a user accesses a server via the network and makes a request for connection for display of information in step S112. In step S114, the server receiving the access authenticates the identification of the user by using keys such as a password and a user ID. If the user's identification is authenticated (yes), the server permits information display processing described below. If the user's identification is not authenticated (no), the server does not permit any further access to the information display system of the present invention. The process then returns to the authentication information input step S114.

In the fifth embodiment of the information display method of the present invention, the server urges the user to proceed to step S116 to input necessary information data. This processing step is not required if the server can store any information probable to be requested by the user. However, it is not sure that the server has data belonging to business secrets held by the user, e.g., the locations of convenience stores and information on sales in the convenience stores. Therefore it is preferable for the server to urge the user to input objects including a target attribute class in step S116, and to perform geocoding of address information by using the input data and register the geocoded information together with other attribute classes in step S118. In a case where business secret information such as a target attribute class is transmitted via the network, suitable encryption processing may be performed on the information.

In step S120, the server receives a user-input search query including information designating minimum support value N, distance D, attribute classes, a target attribute class, and a search area necessary for forming frequent neighboring class sets in accordance with the present invention. In step S122, the server analyzes data packets in the received search query and stores in a suitable memory the information included in the search query to designate minimum support value N, distance D, attribute classes and a target attribute class.

In step S124, frequent neighboring class sets are formed by using the obtained values. In step S126, data for performing display on the GIS is prepared. As processing for forming the frequent neighboring class sets and displaying the obtained data on the GIS, some of the processings according to the first to fourth embodiments of the information display methods of the present invention, which have been described above in detail, may be performed according to user's need.

In step S128, the obtained search results are displayed on a Web page together with electronic map information on a suitable area by being superimposed on the electronic map information. The Web page is displayed on the client to display the search results to the user, thus completing the processing in the fifth embodiment of the information display method of the present invention. FIG. 24 shows an embodiment of the display window opened to a user via a network in the fifth embodiment of the information display method of the present invention. Referring to FIG. 24, information is displayed by using lines of a large thickness, a middle thickness and a small thickness with respect to ranks designated by the user. In FIG. 24, instances ranked 1 are indicated by a circle having the thick line, instances ranked 2 are indicated by a circle having the middle-thickness line, and instances in the lowest rank are indicated by a circle having the thin line.

Information display according to a sixth embodiment of the information display method of the present invention will be described. In the sixth embodiment, a region where the probability of satisfying conditions with respect to a target attribute class is high may be presented as a favorable site on the GIS. Conversely, in a modification of the sixth embodiment of the information display method of the present invention, a region where the probability of satisfying conditions with respect to a target attribute class is low may be presented on the GIS. FIG. 25 shows processing in the sixth embodiment of the information display method of the present invention with respect to an example of display on the GIS of a region where an instance in which the sales volume exceeds a certain threshold vale can be expected.

Processing shown in FIG. 25 is started from step S140 and frequent neighboring class sets including a class for a store of high average sales are listed in step S142. In step S144, instances of each frequent neighboring class set are scored with respect to a target attribute class such as sales volume. In this coring, the sales volume itself may be used or the mean value with respect to each frequent neighboring class set may be used. In step S146, frequent neighboring class sets including the attribute classes other than "branch" in the attribute classes of the listed frequent neighboring class sets are listed and are registered in a state of being related to the scores. In step S148, instances of the frequent neighboring class sets not including "branch" are sorted in decreasing order of score by comparing the scores of the instances.

In step S140, the center coordinates of an indicating figure corresponding to each of the sorted instances of the frequent neighboring class sets are computed, for example, as the coordinates of the centroid in the coordinates of the contained objects, and are registered while being assigned display parameters corresponding to the rank. In step S142, the instances existing in a user-designated display area are selected and the instances of the frequent neighboring class sets are displayed in forms according to the ranks on the GIS. In step S144, regions where indicating figures for the instances higher in rank overlap each other are registered on the GIS, and displayed, for example, by using hatching or solid filling. In step S146, the processing ends. The displayed regions are regions where a sales volume higher than a certain value can be expected, where no branch is installed, and where the probability of obtaining the desired sales value is highest according to a determination based on the frequent neighboring class sets.

More specifically, in the processing shown in FIG. 25, it is first assumed that a frequent neighboring class set including "branch" relating to a sales volume higher than a certain value has elements ({branch, A, B, C, D}). Then, frequent neighboring class sets including "branch", e.g., ({branch, A, B, C}), ({branch, A, B}), ({branch, A}) are listed and a means sales volume is computed with respect to each frequent neighboring class set. Subsequently, instances of frequent neighboring class sets ({A, B, C, D}), ({A, B, C}), ..., ({A}) are extracted and registered by being related to the mean sales volumes.

The obtained instances are sorted in decreasing order of the corresponding means sales volume and the frequent neighboring classes are ranked in decreasing order of sales volume. FIG. 26 shows an embodiment of ranking of the instances formed as described above. From the instances ranked as shown in FIG. 26, only the instances displayable on the display are listed by comparing the centroid coordinates of each instance and the area of the position coordinates for display on the display screen. In the described embodiment, the position of each instance of the frequent neighboring class sets selected on the map display is indicated by a circle about the centroid coordinates of the instance while changing the thickness of the line of the circle. The contents of FIG. 26 indicate that the instances indicated by solid-line rectangular frames are selected as ones having such centroid coordinates as to be displayable on the display screen.

FIG. 27 shows display of information achieved by the above-described processing. A circle 66 shown in FIG. 27 is a circle indicated about the centroid of one instance included in the display area among the instances relating to the highest sales volume rank. Circles 68 and 70 having a smaller line width are indicated as instances relating to a lower rank. Further, regions where the highest sales volume can be expected in the displayed area and where no branch of a convenience store chain or the like exists are indicated by hatching 72.

According to the present invention, the altitude of each object can be included as an attribute class constituting position information as well as information on two-dimensional positions. In a case where the altitude of each object is included, the altitude value may be indicated in a pop-up fashion adjacent to the corresponding object, and the altitude may be indicated by changing coloring, while sales volumes, kinds of service, city districts, etc., are indicated in different forms, thus indicating the altitude of each object to a user. In the present invention, the altitude may be included, for example, in a case where frequent neighboring class sets are formed by setting as a target attribute class the sales volume of a vending machine and by using a target function as to whether the vending machine is installed up a sloping road or down the sloping road.

By referring to FIG. 27, a user can know the conditions of location of existing convenience stores and information on past sales in the existing convenience stores, and can obtain findings about a place where a convenience store may be managed under the same conditions of locations as those of the existing convenience stores that have had expected sales, and where no convenience store has been set up. Then the user can predict the results of selection of that place with efficiency by actually examining the map and by checking the conditions of location on the map without performing an inefficient on-site checking process or repeated checking operations for avoiding wasting labor and time and avoiding making an error in determination.

The arrangements or sections for realizing the above-described functions in accordance with the present invention can be formed as software or software modules written by using a computer-readable programming language. They are not necessarily formed as functional blocks shown in the drawings.

The above-described program for executing the information search method of the present invention may be written by using any of various programming languages, e.g., C language, C++ language, and Java®. Codes in which the program of the present invention is described are stored on a computer-readable recording medium such as a magnetic tape, a flexible disk, a hard disk, a compact disc, magneto-optical disk, or digital versatile disc (DVD).

As described above, the present invention provides an information display system and method enabling advanced information display for users by using spatially mined objects, a program for executing the information display method, a computer-readable storage medium on which the program for the information display method is recorded, a server control method, a program for executing the server control method, a computer-readable storage medium on which the program for the server control method is recorded, and a graphical user interface for displaying information.

The present invention has been described with respect to particular embodiments thereof, but is not limited to the above-described kinds of stores including convenience stores. The present invention enables efficient prediction for location of business facilities such as retail stores, fitness clubs, recreation facilities, and restaurants, location of signals for traffic control, location of wireless communication facilities for optimizing the amount of processing with respect to the amount of communication packets in a cellular telephone system or the like, location of police boxes, location and positioning of cash dispenser machines, and location of banks, post offices, mailboxes, and goods distribution places, etc., as long as information for obtaining effects according to user's needs by satisfying certain conditions of location is used.

It is to be understood that present invention, in accordance with at least one presently preferred embodiment, includes a ********. Together these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if fully set forth in their entirety herein.

Although illustrative embodiments of the present invention have been described herein with reference to the accompanying drawings, it is to be understood that the invention is not limited to those precise embodiments, and that various other changes and modifications by be affected therein by one skilled in the art without departing from the scope or spirit of the invention.

What is claimed is:

1. An information display system for making a computer display objects including position information on an electronic map, said information display system comprising:

a database in which objects including position information and attribute information different from the position information are stored;

an electronic map storage section in which the electronic map is stored;

a set forming section which forms at least a certain number of sets of objects, wherein the objects contained in each set are positioned in proximity with each other and wherein the objects contained in each set are selected according to a certain number of designated classes of attribute information included in the objects within a predetermined distance;

an arrangement for selecting the objects contained in each of the sets by locating position coordinates in the electronic map on which display is performed, displaying the selected objects according to the designated attributes of the selected objects while assigning an indicating figure corresponding to a set of objects, and designating position coordinates for the objects and the indicating figure to be displayed; and an arrangement for placing the objects and the indicating figure on the electronic map by using the designated position coordinates.

2. The information display system according to claim 1, wherein said designation method includes an arrangement for determining, by using the predetermined distance, the size of the indicating figure as such a size that the objects to be displayed are contained inside the area defined by the indicating figure, and an arrangement for changing display parameters for the indicating figure by using a threshold value with respect to a target attribute class.

3. The information display system according to claim 1, wherein said designation method includes an arrangement for determining the size of the indicating figure according to the scale of the electronic map, and said placement method locates the boundary of the indicating figure on the electronic map and places a portion of the indicating figure contained in the electronic map on which the display is performed.

4. An information display method for making a computer display objects including position information on an electronic map, said method comprising:

a step of forming, from a database in which objects including position information and attribute information different from the position information are stored, at least a certain number of sets of objects, wherein the objects contained in each set are positioned in proximity with each other and wherein the objects contained in each set are selected according to a certain number of designated classes of attribute information included in the objects within a predetermined distance;

a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure corresponding to a set of objects, and designating position coordinates for the objects and the indicating figure to be displayed; and a step of placing the objects and the indicating figure on the electronic map by using the designated position coordinates, wherein said designation step includes a step of determining, by using the predetermined distance, the size of the indicating figure as such a size that the objects to be displayed are contained inside the area defined by the indicating figure, and a step of changing display parameters for the indicating figure by using a threshold value with respect to a target attribute class.

5. The information display method according to claim 4, wherein said designation step includes a step of determining the size of the indicating figure according to the scale of the electronic map, and wherein said placement step includes locating the boundary of the indicating figure on the electronic map and placing a portion of the indicating figure contained in the electronic map on which the display is performed.

6. A program for making a computer execute an information display method for displaying objects including position information on an electronic map, said program making the computer execute:

a step of forming, from a database in which objects including position information and attribute information different from the position information are stared, at least a certain number of sets of objects, wherein the objects contained in each set are positioned in proximity with each other and wherein the object contained in each set are selected according to a certain number of designated classes of attribute information included in the objects within a predetermined distance;

a step of reading our an electronic map which is stored in an electronic map storage section and on which display is performed, selecting the objects contained in each of the sets by locating position coordinates in the electronic map, displaying the selected objects according to the designated attributes of the selected objects while assigning an indicating figure corresponding to a set of objects, and designating position coordinates for the objects and the indicating figure to be displayed; and a step of placing the objects and the indicating figure on the electronic map by using the designated position coordinates, wherein said designation step includes a step of determining, by using the predetermined distance, the size of the indicating figure as such a size that the objects to be displayed are contained inside the area defined by the indicating figure.

7. The program according to claim 6, wherein said designation step includes a step of determining the indicating figure according to the scale of the electronic map, and a step of changing display parameters for the indicating figure by using a threshold value with respect to a target attribute class, and wherein said placement step includes locating the boundary of the indicating figure on the electronic map and placing on the electronic map a portion of the indicating figure contained in the electronic map an which the display is performed.

8. A computer-readable storage medium on which is recorded a program for making a computer execute an information display method for displaying objects including position information on an electronic map, said program making the computer execute:

a step of forming, from a database in which objects including position information and attribute information different from the position information are stored, at least a certain number of sets of objects, wherein the objects contained in each set are positioned in proximity with each other and wherein the objects contained in each set are selected according to a certain number of designated classes of attribute information included in the objects within a predetermined distance;

a step of reading out an electronic map which is stored in an electronic map storage section and on which display is performed, selecting the objects contained in each of the sets by locating position coordinates in the electronic map, displaying the selected objects according to the designated attributes of the selected objects while assigning an indicating figure in an indicating form corresponding to a set of objects, and designating position coordinates for the objects and the indicating figure to be displayed; and a step of placing the objects and the indicating figure on the electronic map by using the designated position coordinates, wherein said designation step includes a step of determining, by using the predetermined distance, the size of the indicating figure as such a size that the objects to be displayed are contained inside the area defined by the indicating figure, and a step of changing display parameters for the indicating figure by using a threshold value with respect to a target attribute class.

9. A graphical user interface system for making a computer display position information by displaying objects including the position information on an electronic map, said graphical user interface system comprising:

a database in which objects including position information and attribute information different from the position information are stored;

an electronic map storage section in which the electronic map is stored;

a set forming section which forms at least a certain number of sets of objects, wherein the objects contained in each set are positioned in proximity with each other and wherein the objects contained in each set are selected according to a certain number of designated classes of attribute information included in the objects within a predetermined distance;

an arrangement for reading out the electronic map which is stored in said electronic map storage section and on which display is performed, selecting the objects contained in each of the sets by locating position coordinates in the electronic map, displaying the selected objects according to the designated attributes of the selected objects while assigning an indicating figure corresponding to a set of objects using a threshold value for a target attribute class, and designating position coordinates for the objects and the indicating figure to be displayed; and an arrangement for displaying search results including a plurality of the objects and the indicating figure on the electronic map by using the designated position coordinates.

* * * * *

UNITED STATES PATENT AND TRADEMARK OFFICE
CERTIFICATE OF CORRECTION

PATENT NO. : 7,173,632 B2 Page 1 of 1
APPLICATION NO. : 10/656733
DATED : February 6, 2007
INVENTOR(S) : Inokuchi et al.

It is certified that error appears in the above-identified patent and that said Letters Patent is hereby corrected as shown below:

Column 26, Line 15 "stared" should be --stored--

Column 26, Line 22 "our" should be --out--

Column 26, Line 47 "an" should be --on--

Signed and Sealed this

Eighth Day of May, 2007

JON W. DUDAS
*Director of the United States Patent and Trademark Office*